US012345077B2

(12) United States Patent
Cumbo

(10) Patent No.: US 12,345,077 B2
(45) Date of Patent: Jul. 1, 2025

(54) CLOSURE LATCH ASSEMBLY EQUIPPED WITH A POWER CINCH MECHANISM HAVING A CINCH PAWL

(71) Applicant: Magna Closures Inc., Newmarket (CA)

(72) Inventor: Francesco Cumbo, Newmarket (CA)

(73) Assignee: Magna Closures Inc., Newmarket (CA)

( * ) Notice: Subject to any disclaimer, the term of this patent is extended or adjusted under 35 U.S.C. 154(b) by 388 days.

(21) Appl. No.: 17/824,239

(22) Filed: May 25, 2022

(65) Prior Publication Data

US 2022/0381072 A1 Dec. 1, 2022

Related U.S. Application Data

(60) Provisional application No. 63/310,722, filed on Feb. 16, 2022, provisional application No. 63/193,307, filed on May 26, 2021, provisional application No. 63/193,370, filed on May 26, 2021.

(51) Int. Cl.

| | |
|---|---|
| ***E05B 85/26*** | (2014.01) |
| ***E05B 81/20*** | (2014.01) |
| ***E05B 81/64*** | (2014.01) |
| ***E05B 85/02*** | (2014.01) |
| ***E05B 85/24*** | (2014.01) |
| *E05B 81/06* | (2014.01) |

(52) U.S. Cl.

CPC .............. *E05B 85/26* (2013.01); *E05B 81/20* (2013.01); *E05B 81/64* (2013.01); *E05B 85/02* (2013.01); *E05B 85/243* (2013.01); *E05B 81/06* (2013.01)

(58) Field of Classification Search

CPC ........ E05B 85/26; E05B 85/02; E05B 85/243; E05B 81/20; E05B 81/64; E05B 81/06

USPC ........................................................ 292/229

See application file for complete search history.

(56) References Cited

U.S. PATENT DOCUMENTS

| | | | | |
|---|---|---|---|---|
| 4,872,714 | A | 10/1989 | Brusasco | |
| 6,341,448 | B1 | 1/2002 | Murray et al. | |
| 6,848,727 | B1 | 2/2005 | Cetnar et al. | |
| 9,810,004 | B2 * | 11/2017 | Scholz | E05B 81/20 |
| 10,745,947 | B2 | 8/2020 | Okeke et al. | |
| 10,767,397 | B2 | 9/2020 | Ottino et al. | |
| 11,162,284 | B2 | 11/2021 | Ottino et al. | |

(Continued)

FOREIGN PATENT DOCUMENTS

| | | |
|---|---|---|
| CN | 110029890 A | 7/2019 |
| CN | 110130753 A | 8/2019 |

(Continued)

*Primary Examiner* — Kristina R Fulton
*Assistant Examiner* — James Edward Ignaczewski
(74) *Attorney, Agent, or Firm* — Dickinson Wright PLLC

(57) ABSTRACT

A latch assembly for a vehicle includes a latch housing, a ratchet, a main pawl, and a cinch mechanism including a cinch pawl and a cinch link lever. When the ratchet moves to a secondary striker capture position, the cinch pawl moves into a blocking position to hold the ratchet. The cinch pawl is actuatable by a cinch lever to move the ratchet to a cinched striker capture position and the main pawl to ratchet checking position. The cinch pawl may be blocked by a stop feature formed in the latch housing in the secondary striker capture position, which resists an opening force exerted on the ratchet. The cinch pawl may be coupled to the cinch link lever, and the cinch link lever may pivot about the same post as the ratchet designed to resist high loads.

19 Claims, 17 Drawing Sheets

(56) References Cited

U.S. PATENT DOCUMENTS

| | | | | |
|---|---|---|---|---|
| 2016/0186468 | A1 | 6/2016 | Ilea | |
| 2016/0244999 | A1* | 8/2016 | Ottino | E05B 85/26 |
| 2017/0089103 | A1 | 3/2017 | Ottino et al. | |
| 2017/0089105 | A1 | 3/2017 | Margheritti | |
| 2017/0306661 | A1* | 10/2017 | Kim | E05B 81/20 |
| 2018/0051494 | A1 | 2/2018 | Scocco | |
| 2018/0100331 | A1* | 4/2018 | Cumbo | E05B 81/68 |
| 2019/0003214 | A1 | 1/2019 | Cumbo et al. | |
| 2019/0017301 | A1* | 1/2019 | Cumbo | E05B 85/26 |
| 2019/0145135 | A1* | 5/2019 | Lebsak | E05B 83/24 292/229 |
| 2019/0242163 | A1 | 8/2019 | Cetnar et al. | |
| 2019/0292817 | A1* | 9/2019 | Tomaszewski | E05B 79/20 |
| 2019/0301212 | A1* | 10/2019 | Digel | E05B 81/14 |
| 2022/0298834 | A1* | 9/2022 | Distefano | E05B 81/14 |

FOREIGN PATENT DOCUMENTS

| | | | |
|---|---|---|---|
| CN | 111794611 | A | 10/2020 |
| DE | 10231825 | A1 | 4/2004 |
| DE | 102014003737 | A1 | 9/2015 |
| EP | 0978609 | A1 | 2/2000 |
| EP | 1176273 | A2 | 1/2002 |
| EP | 4077842 | B1 | 7/2023 |
| GB | 0503386 | A | 12/2007 |
| JP | H049912 | B2 | 2/1992 |
| WO | 03071064 | A1 | 8/2003 |

* cited by examiner

CLOSURE LATCH ASSEMBLY EQUIPPED WITH A POWER CINCH MECHANISM HAVING A CINCH PAWL

CROSS-REFERENCE TO RELATED APPLICATIONS

The present application claims the benefit of previously filed U.S. Provisional Patent Application No. 63/193,370, filed May 26, 2021, previously filed U.S. Provisional Patent Application No. 63/193,307, filed May 26, 2021, and previously filed U.S. Provisional Patent Application No. 63/310,722, filed Feb. 16, 2022, each of which are hereby incorporated by reference in their entirety.

FIELD OF THE INVENTION

The present disclosure relates generally to a latch system for a vehicle closure panel and, more particularly, to a power latch assembly having a power cinch system.

BACKGROUND OF THE INVENTION

This section provides background information related to the present disclosure which is not necessarily prior art.

In view of increased consumer demand for motor vehicles equipped with advanced comfort and convenience features, many modern motor vehicles are now provided with passive entry systems to permit locking and release of closure panels (i.e., doors, tailgates, liftgates and decklids) without use of a traditional key-type entry system. In this regard, some popular features now available with vehicle latch systems include power locking/unlocking, power release and power cinching. These "powered" features are provided by a latch assembly mounted to the closure panel and which includes a ratchet and pawl type of latching mechanism controlled via at least one electric actuator. Typically, the closure panel is held in a closed position by virtue of the ratchet being positioned in a striker capture position to releaseably retain a striker that is mounted to a structural portion of the vehicle. The ratchet is held in its striker capture position by the pawl engaging the ratchet in a ratchet holding position. In most ratchet and pawl type of latching mechanisms, the pawl is operable in its ratchet holding position to retain the ratchet in a secondary striker capture position and a primary striker capture position. Latch assemblies providing a power cinching feature are typically equipped with a cinching mechanism operated by an electric actuator. Commonly, the cinching mechanism is directly connected to the ratchet and, when actuated, is operable for moving the ratchet from its secondary striker capture position into its primary or cinched striker capture position, thereby cinching the closure panel in its closed position. To subsequently release the closure panel from its closed position, a release mechanism is actuated for moving the pawl from its ratchet holding position into a ratchet release position, whereby a ratchet biasing arrangement forcibly pivots the ratchet from its primary striker capture position into an open position or striker release position so as to release the striker. In latch assemblies providing a power release feature, the release mechanism is controlled by an electric actuator. A common electric actuator or separate electric actuators can be used in associated with the power release and power cinching features.

In most latch assemblies equipped with a power cinching feature, the cinching mechanism is normally maintained in a non-actuated or "stand-by" condition and is shifted into an actuated condition once the sensors indicate that the ratchet is located in its secondary striker capture position. Following completion of the cinching operation, when the sensors indicate that the ratchet is located in its primary striker capture position, the cinching mechanism is "reset", that is returned to its stand-by condition, to permit subsequent uninhibited movement of the ratchet to its striker release position via actuation of the release mechanism. One example of a power cinching latch assembly is disclosed in U.S. Pat. No. 6,341,448 as having a cable-type cinching mechanism, which is hereby incorporated by reference in its entirety.

To ensure that precipitation and road debris do not enter the vehicle, virtually all vehicle closure panels are equipped with weather seals around their peripheral edge and which are configured to seal against a mating surface of the vehicle body surrounding the closure opening. These weather seals also function to reduce wind noise. The seals are typically made from an elastomeric material and are configured to compress upon closing the closure panel by virtue of the latch assembly. As is recognized, increasing the compressive clamping force applied to the weather seals provides improved noise reduction within the passenger compartment. As will be appreciated, with the weather seals held in a highly compressed condition, they tend to force the closure panel toward its open position and this "opening" force is resisted by the pawl and ratchet latching mechanism of the power latch assembly. Because the seal loads exerted on the latching mechanism are increased, the forces required to release the latching mechanism are also increased which, in turn, impacts the size and power requirements of the electric actuator.

During a closing operation of the closure panel, the ratchet will move from its open position toward the secondary striker capture position prior to moving to the cinched striker capture position. In the secondary position, and prior to a cinching operation, it is possible for forces to be exerted on the closure panel that urge the closure panel to open and provide an opening force on the ratchet. The mechanism for holding the ratchet in the secondary striker position must therefore be able to resist such loading. This loading may be increased due to the desire for high seal loads to provide the benefits described above. This loading on the cinching mechanism may cause stress on the kinematic chain of the cinching mechanism, up to an including the power cinching actuator.

Latch assemblies have also been developed to controllably release the seal loading from the primary striker capture position in coordination with release of the latching mechanism. For example, European Publication No. EP1176273 discloses a single ratchet/double pawl type of power-operated latching mechanism that is configured to provide a progressive releasing of the ratchet for reducing noise associated with its release. In addition, European Publication EP0978609 utilizes an eccentric mechanism in association with a single pawl latching mechanism to reduce seal loads prior to release of the ratchet. A one-motor latch power latch assembly and cinching system with power cinch and power release having a soft opening function is disclosed in U.S. Pat. No. 10,767,397, the entire content of which is hereby incorporated by reference in its entirety.

While current power latch assemblies are sufficient to meet regulatory requirements and provide enhanced comfort and convenience, a need still exists to advance the technology and provide alternative power latch assemblies and arrangements that address and overcome at least some of the known shortcomings.

SUMMARY OF THE INVENTION

This section provides a general summary of the disclosure and is not intended to be a comprehensive disclosure of all features, advantages, aspects and objectives associated with the inventive concepts described and illustrated in the detailed description provided herein.

It is an aspect of the present disclosure to provide a power latch assembly for a motor vehicle closure system configured to provide a cinch system with a hard stop for a cinch pawl for holding the ratchet in a secondary latched position.

In one aspect, a latch assembly for a motor vehicle is provided, including: a ratchet moveable between a striker release position whereat said ratchet is positioned to release a striker and at least two striker capture positions whereat said ratchet is positioned to retain the striker, wherein said at least two striker capture positions include a secondary latched position and a cinched striker capture position; a ratchet biasing member for normally biasing said ratchet toward its striker release position; a pawl moveable between a ratchet checking position whereat said pawl is positioned to hold said ratchet in the cinched striker capture position and a ratchet release position whereat said pawl permits movement of said ratchet to its striker release position; a pawl biasing member for normally biasing said pawl toward its ratchet checking position; a latch cinch mechanism including a cinch link lever having a first position that engages a first engagement member on said ratchet when said ratchet is in its striker release position and being biased toward the first engagement member, wherein movement of the ratchet toward the ratchet release position causes the cinch link lever to move to a second position; a cinch pawl coupled to said cinch link lever and having a first position disengaged from the ratchet when the cinch link lever is in its first position, wherein movement of the cinch link lever to its second position moves the cinch pawl toward a second position thereof; a cinch lever coupled to said cinch pawl and having a non-actuated and an actuated position; an override lever coupled to the cinch link lever, wherein movement of the override lever causes movement of the cinch link lever, and wherein movement of override lever is allowed in accordance with movement of the cinch link lever from its first position to its second position in response to movement of the ratchet from the open position to the secondary striker capture position; wherein movement of the ratchet from its open position toward its secondary striker capture position causes the cinch link lever, cinch pawl, and override lever to move to their second positions; wherein, following movement of the ratchet to its secondary striker capture position, actuation of the cinch lever to its actuated position causes sliding movement of the cinch pawl relative to the cinch link lever, wherein the cinch pawl contacts a second engagement member of the ratchet, thereby forcibly moving the ratchet to its cinched striker capture position, and wherein the pawl moves to its ratchet checking position; wherein the latch assembly includes a frame, and the frame includes a stop projecting from an inner surface thereof, wherein following movement of the ratchet to its secondary striker capture position, the stop blocks the cinch pawl and the cinch pawl blocks the second engagement member from moving toward the ratchet release position in response to an opening force exerted on the ratchet.

In one aspect, the stop is integrally formed with the frame.

In one aspect, the stop has a ring shape and defines a through-hole configured for receiving a fastener therethrough for fastening the frame.

In one aspect, the pawl engages the ratchet on an opposite radial side of the ratchet relative to the engagement between the cinch pawl and the ratchet.

In one aspect, the override lever is biased toward its second position and is held in first position by the cinch link lever when the cinch link lever is in its first position and the ratchet is in the open position.

In one aspect, the override lever contacts an override sensor when in its first position to indicate that the ratchet is in the open position and the cinch link lever is in its first position, and wherein the override lever is out of contact with the override sensor when in the second position and the cinch link lever is in the second position to indicate that the ratchet is in the secondary striker capture position or the cinched striker position.

In one aspect, the pawl contacts a pawl sensor when in the actuated position with the pawl in contact with the ratchet to indicate that the ratchet is in the open position, and wherein the pawl moves out of contact with the pawl sensor when the ratchet is in the cinched striker capture position and the pawl is in the ratchet checking position in contact with the notch of the ratchet to indicate that the ratchet is in the cinched striker capture position.

In one aspect, both the override sensor and the pawl sensor are contacted when the ratchet is in the open position, wherein the override sensor is out of contact and the pawl sensor is contacted when the ratchet is in the secondary striker capture position, and wherein the override sensor and the pawl sensor are both out of contact when the ratchet is in the cinched striker capture position In one aspect, the override sensor provides a signal to a controller to being a cinch operation when the override sensor is out of contact with the override lever.

In one aspect, the pawl sensor provides a signal to the vehicle controller to stop a cinch operation when the pawl sensor is out of contact with the pawl.

In one aspect, when the ratchet is in the cinched striker capture position and the main pawl is in the ratchet checking position, actuation of the pawl via manual actuation or power actuation release causes both the pawl and the cinch pawl to move away from engagement with the ratchet and the ratchet moves to the open position.

In one aspect, the second engagement member is on a first side of the cinch pawl when the ratchet is in the open position and the second engagement member is on a second side of the cinch pawl when the ratchet is in the secondary striker capture position or the cinched striker capture position, wherein the ratchet and second engagement member are biased toward the first side of the cinch pawl such that the cinch pawl blocks the ratchet and second engagement member from moving toward the open position when the cinch pawl is in the path of the second engagement member.

In one aspect, actuation of the pawl to release the ratchet when the cinch lever and cinch pawl actuated causes movement of the cinch pawl out of engagement with the ratchet and allowing the ratchet to move to the open position.

In one aspect, following actuation of the pawl to the ratchet release position, and corresponding movement of the ratchet to the open position, the cinch link lever and the cinch pawl are biased toward the ratchet by the override lever, and the cinch pawl is maintained out of the path of the second engagement member.

In another aspect, a latch assembly for a motor vehicle is provided, the latch assembly including: a ratchet biased toward an open position and moveable from the open position to a secondary striker capture position, and from the secondary striker capture position to a cinched striker capture position; a main pawl biased toward the ratchet and operable between a ratchet checking position where the main pawl holds the ratchet in the cinched striker capture position and a ratchet release position where the main pawl allows the ratchet to move to the open position; a cinch mechanism including a cinch pawl biased toward the ratchet and operable between a blocking position where the cinch pawl blocks movement of the ratchet from the secondary striker capture position to the open position and a release position where the cinch pawl allows the ratchet to move from the secondary striker capture position to the open position; a stop feature formed on a latch housing, wherein the cinch pawl is disposed between the stop feature and the ratchet along a rotational path of the ratchet when the cinch pawl is in the blocking position, wherein the stop feature resists an opening force exerted on the ratchet when the cinch pawl is in the blocking position and in contact with the stop feature.

In one aspect, the cinch mechanism includes a cinch link lever coupled to the cinch pawl, wherein the cinch link lever is biased toward a non-actuated position and moveable to an actuated position in response to actuation of the main pawl, wherein the cinch link lever moves the cinch pawl to the release position in response to actuation of the cinch link lever during actuation of the main pawl.

In one aspect, the cinch link lever is biased against the ratchet and held in the actuated position when the ratchet is in the open position, wherein the cinch link lever moves to the non-actuated position in response to movement of the ratchet from the open position to the secondary striker capture position, wherein the cinch pawl moves to the blocking position in response to the cinch link lever moving to the non-actuated position.

In one aspect, the cinch pawl is moveable from the blocking position to an actuated position and away from the stop feature in response to actuation by a cinch lever coupled to the cinch pawl, wherein movement of the cinch pawl to the actuated position moves the ratchet to the cinched striker capture position, wherein the main pawl moves to the ratchet checking position in response to the ratchet moving to the cinched striker capture position.

In one aspect, a method of operating a latch mechanism having a ratchet, a main pawl, and a cinch pawl is provided, the method including the steps of: providing a ratchet moveable from an open position to a secondary striker capture position and from the secondary striker capture position to the open position; positioning the ratchet in the open position, wherein in the open position a main pawl is biased into engagement with the ratchet and a cinch link lever is biased into engagement with the ratchet, wherein the cinch link lever is coupled to a cinch pawl and maintains the cinch pawl in a release position disengaged from the ratchet; moving the ratchet from the open position to the secondary striker capture position and, in response thereto, releasing the cinch link lever from biased engagement with the ratchet and moving the cinch link lever to a non-actuated position, wherein the cinch pawl moves into a blocking position and biased engagement with the ratchet, wherein the cinch pawl blocks the ratchet from moving to the open position; contacting a stop feature formed in a housing of the latch assembly with the cinch pawl when the cinch pawl is in the blocking position, wherein the stop feature resists an opening force exerted on the ratchet; actuating a cinch lever coupled to the cinch pawl when the cinch pawl is in the blocking position and, in response thereto, moving the cinch pawl away from the stop feature and moving the ratchet from the secondary striker capture position to the cinched striker capture position; moving the main pawl into a notch of the ratchet when the ratchet is in the cinched striker capture position and holding the ratchet in the cinched striker capture position.

In one aspect, the method includes actuating the main pawl via power actuation or manual actuation and, in response thereto, moving the main pawl against its bias and out of engagement with the ratchet, wherein moving the main pawl causes actuation of the cinch link lever to move against its bias and into its actuated position, thereby moving the cinch pawl out of engagement with the ratchet and to the release position and, in response thereto, moving the ratchet to the open position.

In another aspect, a latch assembly for a motor vehicle is provided, including: a ratchet moveable between a striker release position whereat said ratchet is positioned to release a striker and at least two striker capture positions whereat said ratchet is positioned to retain the striker, wherein said at least two striker capture positions include a secondary latched position and a cinched striker capture position; a ratchet biasing member for normally biasing said ratchet toward its striker release position; wherein the ratchet is supported by and rotatable about a pivot post for movement between the striker release position and the at least two striker capture positions.

A pawl moveable between a ratchet checking position whereat said pawl is positioned to hold said ratchet in the cinched striker capture position and a ratchet release position whereat said pawl permits movement of said ratchet to its striker release position; a pawl biasing member for normally biasing said pawl toward its ratchet checking position; a latch cinch mechanism including a cinch link lever moveable between a first position and a second position and biased toward the first position; a cinch pawl pivotably coupled to one end of the cinch link lever and moveable between a first position and a second position and biased toward the ratchet; a cinch lever pivotably mounted to a second end of the cinch link lever and having a non-actuated and an actuated position; an override lever coupled to the cinch pawl and moveable between a first position and a second position and biased toward the ratchet; wherein the cinch link lever is supported by and mounted to the pivot post of the ratchet and moveable about the pivot post between the first position and the second position; wherein a side of the cinch pawl is biased into engagement with an engagement feature projecting outwardly from a face of the ratchet when the cinch pawl is in the first position and the ratchet is in the striker release position, and movement of the ratchet to the second striker capture position causes movement of the cinch pawl to the second position whereat the cinch pawl blocks the engagement feature and the ratchet from movement toward the striker release position; wherein actuation of the cinch lever to the second position causes movement of the cinch link lever to the second position, and the cinch pawl forces the engagement feature and the ratchet toward the cinched striker capture position; wherein the pawl moves to the ratchet checking position and holds the ratchet in the cinched striker capture position.

In one aspect, the override lever and cinch pawl are coupled for joint movement from the first position to the second position. In one aspect, the cinch pawl includes a pin projecting outwardly therefrom that is received in slot defined by the override lever.

In one aspect, the bias on the cinch pawl toward the ratchet is provided by the override lever.

In one aspect, movement of the override lever from the second position to the first position moves the cinch pawl from blocking the engagement feature to allow the ratchet to move to the striker release position.

In one aspect, pin of the cinch pawl extends through a slot defined by the cinch link lever such that the cinch pawl is moveable between the first position and the second position relative to the cinch link lever.

In one aspect, movement of the cinch link lever from the first position to the second position pulls the cinch pawl, and the pin of the cinch pawl slides along the slot defined by the override lever while the override lever remains in the second position.

In one aspect, when in the secondary latched position, an opening force on the ratchet is transferred to the cinch link lever via engagement between the cinch pawl and the engagement member, wherein torques are exerted on both the ratchet and the cinch link lever about the pivot post.

In one aspect, the cinch lever is disposed stack-wise between the cinch pawl and the override lever.

In one aspect, both a power release actuation and a manual release actuation force the override lever from the second position to the first position, thereby moving the cinch pawl to the first position to allow the ratchet to move to the striker release position when the pawl moves to the ratchet release position.

In another aspect, a method of operating a latch mechanism is provided, the latch mechanism having a ratchet, a main pawl, and a cinch pawl, the method including the following steps: providing a ratchet moveable from an open position to a secondary striker capture position and from the secondary striker capture position to a cinched striker capture position; positioning the ratchet in the open position, wherein in the open position a main pawl is biased into engagement with the ratchet and a cinch pawl is biased into engagement with a ratchet post that extends outwardly from a face of the ratchet; moving the ratchet from the open position to the secondary striker capture position and, in response thereto, pivoting the cinch pawl inwardly into a rotational path of the ratchet post in an opening direction, wherein the cinch pawl moves into a blocking position and engagement with the ratchet post, wherein the cinch pawl blocks the ratchet from moving to the open position; actuating a cinch lever coupled to a cinch link lever, wherein the cinch link lever is pivotably mounted to a pivot post, wherein the pivot posts supports both the ratchet and the cinch link lever for rotation, wherein actuation of the cinch lever causes rotation of the cinch link lever about the pivot post, wherein rotation of the cinch link lever causes movement of the cinch pawl in a cinching direction; moving the cinch pawl in the cinching direction and pushing against the ratchet post with the cinch pawl and, in response thereto, rotating the ratchet to the cinched striker capture position; in response to moving the ratchet to the cinched striker capture position, moving the main pawl into a notch of the ratchet when the ratchet is in the cinched striker capture position and holding the ratchet in the cinched striker capture position.

In accordance with another aspect, there is provided a latch assembly for a motor vehicle, the latch assembly having a latch housing, a ratchet supported on the latch housing and biased toward an open position and moveable from the open position to a secondary striker capture position, and from the secondary striker capture position to a primary striker capture position, a main pawl supported on the latch housing and biased toward the ratchet and operable between a ratchet checking position where the main pawl holds the ratchet in the primary striker capture position and a ratchet release position where the main pawl allows the ratchet to move to the open position; and a cinch mechanism including a cinch pawl biased toward the ratchet and operable between a blocking position where the cinch pawl blocks movement of the ratchet from the secondary striker capture position to the open position and a release position where the cinch pawl allows the ratchet to move from the secondary striker capture position to the open position, wherein an opening force exerted on the ratchet when the cinch pawl is holding the ratchet in the second striker capture position causes the cinch pawl to be compressed between the ratchet and the latch housing.

DRAWINGS

The drawings described herein are for illustrative purposes only of selected embodiments and not all possible implementations such that the drawings are not intended to limit the scope of the present disclosure.

DETAILED DESCRIPTION

Example embodiments will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

Figure 1A:
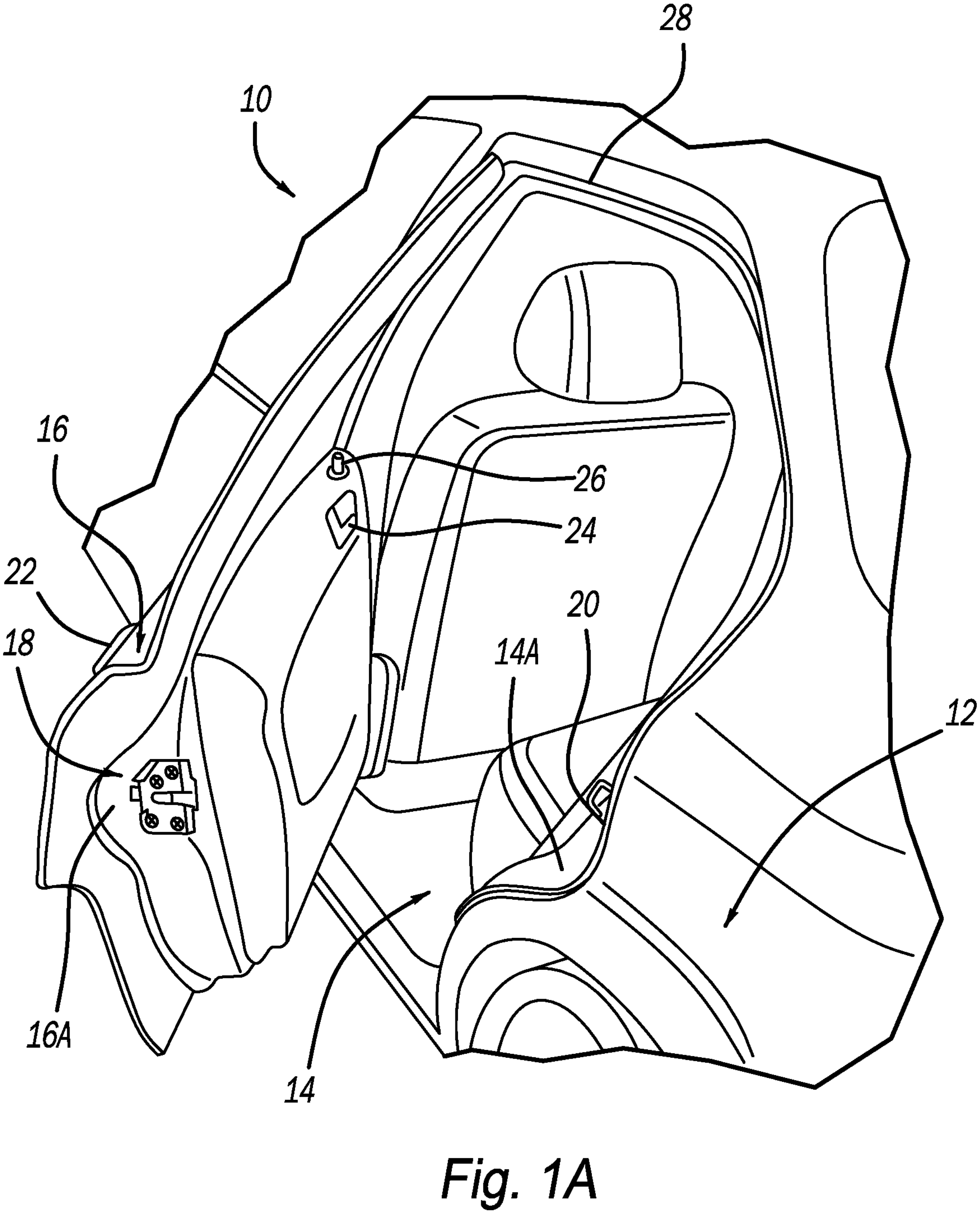
FIG. 1A is an isometric view of a vehicle with a closure panel having a latch system according to an aspect of the disclosure.
Figure 1B:
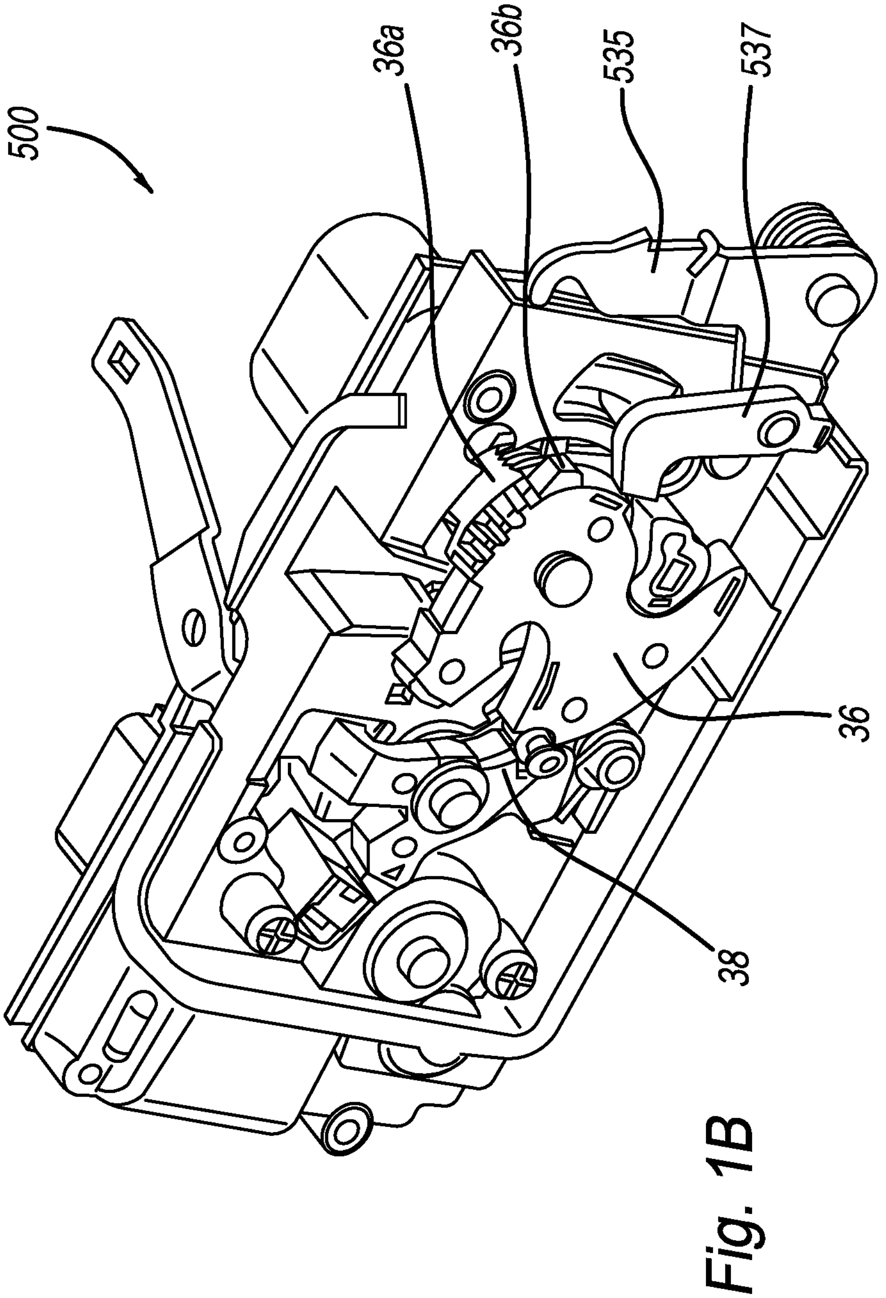
FIG. 1B is a perspective view of an interior of a latch system, illustrating a bottom view of a ratchet and a cinching system including a cinch pawl.

Referring initially to FIG. 1A of the drawings, a motor vehicle 10 is shown to include a vehicle body 12 defining an opening 14 to an interior passenger compartment. A closure panel 16 (such as a door as shown, but which may be other vehicle closure panels) is pivotably mounted to body 12 for movement between an open position (shown) and a fully closed position to respectively open and close opening 14. A power latch assembly 18 is rigidly secured to closure panel 16 adjacent to an edge portion 16A thereof and is releasably engageable with a striker 20 that is fixedly secured to a recessed edge portion 14A of opening 14. As will be detailed, power latch assembly 18 is operable to engage striker 20 and releasably move closure panel 16 into its fully closed position. An outside handle 22 and an inside handle 24 are provided for actuating power latch assembly 18 to release striker 20 and permit subsequent movement of closure panel 16 to its open position. One or both of the outside handle 22 or inside handle may also manually actuate the latch assembly 18. An optional lock knob 26 is shown which provides a visual indication of the locked state of latch assembly 18 and which may also be operable to mechanically change the locked state of latch assembly 18. A weather seal 28 is mounted on edge portion 14A of opening 14 in vehicle body 12 and is adapted to be resiliently compressed upon engagement with a mating sealing surface of closure panel 16 when closure panel 16 is held by latch assembly 18 in its closed position so as to provide a sealed interface therebetween which is configured to prevent entry of rain and dirt into the passenger compartment while minimizing audible wind noise.

FIGS. 1B-5 illustrate latch system 500 (which may be used with latch 18 of FIG. 1A or other vehicle latches) including motor 582, worm 586, and gear assembly 188 (including compound gear **188*a* in meshed engagement with worm 586 and second gear 188*b* in meshed engagement with compound gear 188*a*). Latch system 500 also includes main pawl 38, which is pivotally biased toward the ratchet 36 and operable to slide along an outer edge of ratchet 36 when the ratchet 36 is moving toward the closed position, and is further operable to engage the ratchet 36 to perform a ratchet-holding function to keep the ratchet 36 in a cinched striker capture position. Main pawl 38 is further operable to be power actuated via the linkage connecting the main pawl 38 to the motor 582 to release the ratchet 36, thereby allowing the ratchet 36 to open to a ratchet released position due to the ratchet 36** being biased toward the ratchet released position.

A roller element 37 may be provided between the pawl 38 and the ratchet 36 for reducing release efforts. Illustrative examples of a roller elements or bearings and associated roller supporting configurations are shown in co-owned United State Patent Application No. 2019/0242163 entitled "Closure latch assembly with latch mechanism having roller pawl assembly" and co-owned U.S. patent Ser. No. 10/745,947B2 entitled "Automotive latch including bearing to facilitate release effort", the entire contents of which are incorporated herein by reference. A backstopping configuration using a cinching mechanism as described herein below may provide a separate and additional striker capturing mechanism for the ratchet 36 in the event the primary pawl 38 may release during a crash condition for example.

Figure 3:
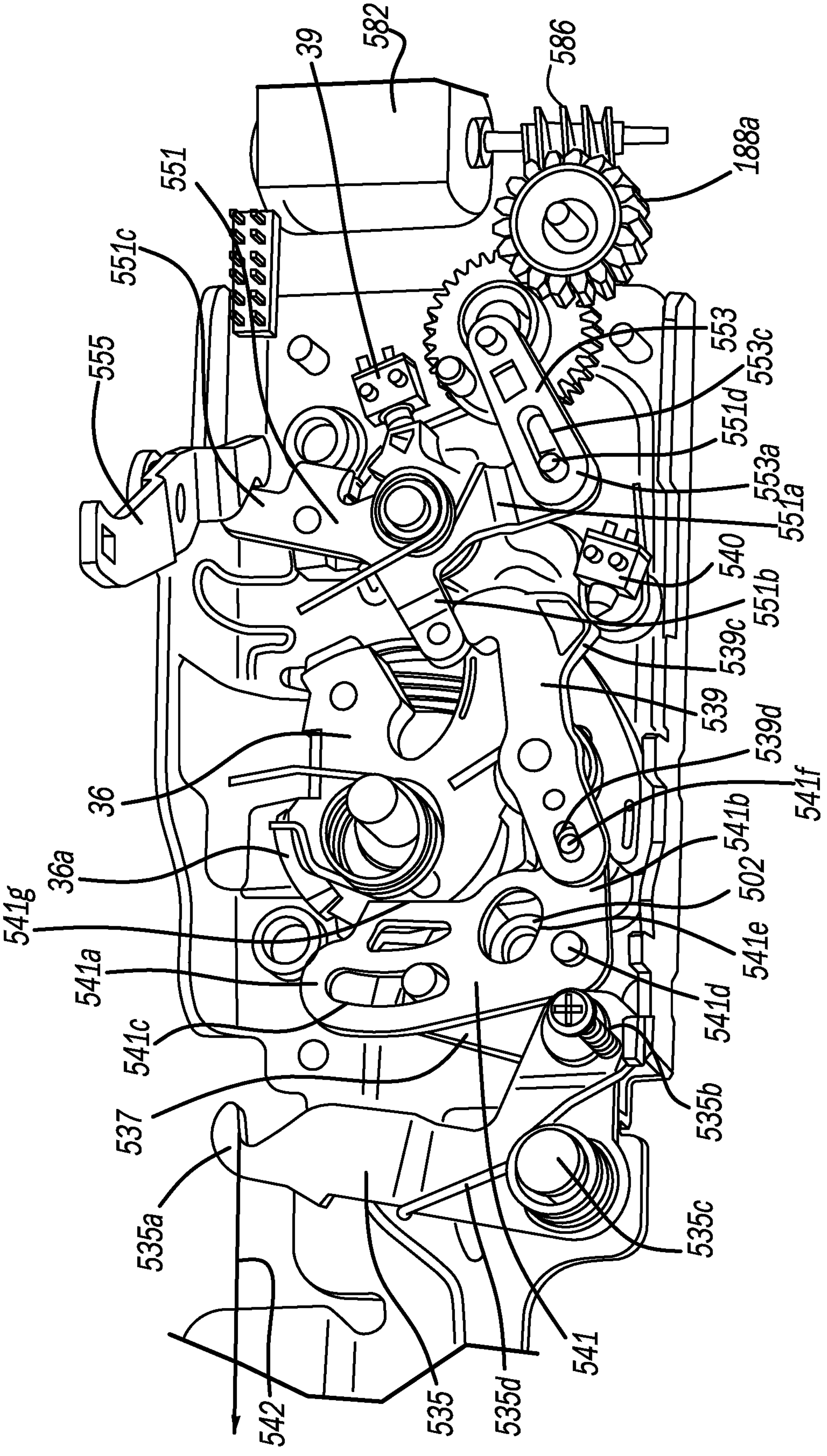
FIG. 3 is a top perspective view of the latch system, illustrating a cinch link lever coupled to the cinch pawl and further coupled to an override lever.

With reference to FIG. 3, the cinch functionality may be provided by a plurality of cinch components, which can be actuated by a power actuator (not explicitly shown) to cinch the latch assembly. The cinch components may also be actuated or manipulated in response to a release function to allow the ratchet to be released independent of the cinch state. The plurality of cinch components include cinch lever 535, cinch pawl 537, override lever 539, and cinch link lever 541, each of which are operably coupled together.

Cinch lever 535 is shown having an L-shape with a first end **535*a* configured for being pulled or otherwise actuated by the cinch actuator, such as via cable 542 that is coupled to cinch actuator 504. A second end 535*b* is coupled to the cinch pawl 537. The cinch lever 535 is pivotable about pivot pin 535*c*, which may be fixed to frame 501. Cinch lever 535 is biased clockwise in FIG. 3 about pin 535*c* by spring 535*d*. As is evident from FIG. 3, actuation of the first end 535*a* of cinch lever 535 to the left will cause second end 535*b*** to move upward.

Figure 4:
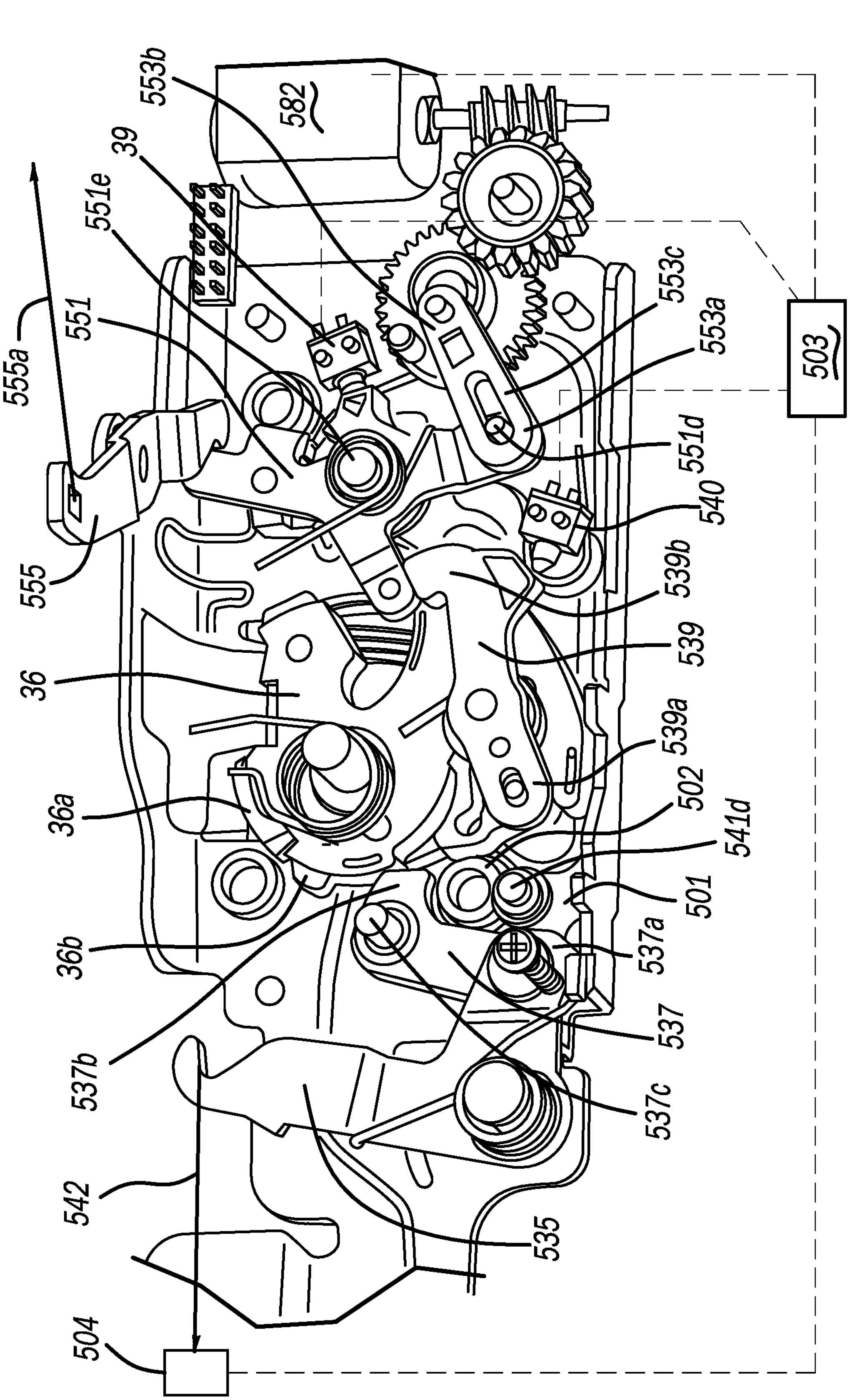
FIG. 4 is top perspective view similar to the FIG. 3, with the cinch link lever removed for clarity, and illustrating a hard stop on a frame of the latch system for blocking the cinch pawl and holding the ratchet in a secondary latched position.

As shown in FIG. 4, cinch pawl 537 is pivotally coupled to second end **535*b* of cinch lever 535, such that actuation of cinch lever 535 about its pivot axis at pin 535*c* causes movement of the cinch pawl 537 toward and against corresponding structure of the ratchet 36. More particularly, first end 537*a* of cinch pawl 537 is coupled to cinch lever 535, and second end 537*b* is configured to engage ratchet 36**.

Cinch pawl 537 further includes post **537*c* that projects from the second end 537*b* of cinch pawl 537 and which is slidingly coupled to cinch link lever 541 (as shown in FIG. 3), such that cinch pawl 537 may be moved toward and against the ratchet 36 in response to actuation by cinch lever 535 while sliding relative to the cinch link lever 541**.

As shown in FIG. 3, cinch link lever 541 has an L-shape and includes first end **541*a* and second end 541*b*, along with curved slot 541*c* disposed along the first end 541*a*. Additionally, cinch link lever 541 is coupled to override lever 539, such that override lever 539 is pivotally moved about its axis in response to pivotable movement of cinch link lever 541. The post 537*c* that projects from cinch pawl 537 extends into and is captured within the slot 541, allowing the cinch pawl 537 to move and the post 537*c* to slide along the slot 541*c*. Cinch link lever 541 is pivotable about pin 541*d* (shown in FIG. 4) which may be fixed to frame 501. Cinch link lever 541 also includes an opening 541*e* adjacent pin 541, which allows for a fastener of the latch 500 to extend through the body of the cinch link lever 541 and still allow pivotable movement of the cinch link lever 541**.

Cinch link lever 541 further includes post 541*f* projecting from the second end 541*b*. The post 541*f* couples the cinch link lever 541 to override lever 539, such that pivotable actuation of override lever 539 will pull up on the post 541*f*, causing pivotable movement (counter-clockwise in FIG. 3) of cinch link lever 541. Override lever 539 is biased toward its non-actuated position, with this biased movement likewise being imparted on cinch link lever 541 to cause the opposite movement of cinch link lever 541 (clockwise in FIG. 3).

As shown in FIG. 4, ratchet 36 includes an elongate curved projection, or first engagement feature, 36*a* (FIG. 3) on the same side of the ratchet 36 as the cinch link lever 541 and which projects from the face of the ratchet 36. Ratchet 36 also includes lug, or second engagement member, 36*b*, which projects radially outward from the ratchet 36, and which is configured for being contacted by second end 537*b* of cinch pawl 537 during a cinching operation when cinch pawl 537 moves upward. The lug 36*b* is also configured for being blocked in the ratchet opening direction (counter-clockwise in FIG. 4) by the second end 537*b* of cinch pawl 537 when the ratchet 36 is in the secondary striker capture position (and when the cinch pawl 537 is in position to do so). Lug 36*b* and projection 36*a* may also be referred to as engagement features. As described further below, the cinch pawl 541 may be moved out of the path of the lug 36*b* when cinch link lever 541 is actuated, thereby allowing the ratchet 36 to move past the second end 541*b* of cinch pawl 541.

When ratchet 36 is in an open position (such as after being released and in position to receive the latch striker during a door closing operation), first end 541*b* of cinch link lever 541 may be biased against the curved outer surface of projection 36*a* (via non-actuated bias of override lever 539 pulling down on the second end 541*b* of cinch link lever 541). More particularly, lateral surface 541*g* of cinch link lever is in contact with projection 36*a*. In this position of the cinch link lever 541, the override lever 539 is limited from returning fully to its non-actuated position.

Thus in this blocked position of the cinch link lever 541 when the ratchet is in the open position, override lever 539 is therefore pivoted to such a position that projection 539*c* of override lever 539 is contact with override lever switch 540, indicating to a latch controller or other vehicle controller 503 that the ratchet 36 is open. When the ratchet 36 is open, cinch link lever 541 maintains cinch pawl 537 out of the path of lug 36*b* of ratchet 36, and ratchet 36 may be rotated from the open position toward the secondary latched position, at which time cinch link lever 541 will shift inward when projection 36*a* moves past the end of lateral surface 541*g*, and cinch pawl 537 will shift inward along with cinch link lever 541 via post 537*c* and slot 541*c*. Additionally, second end 541*b* of cinch link lever 541 will pivot downward along with rotation of override lever 539, and switch 540 will no longer be in engagement with override lever 539, thereby signaling that the ratchet is in the secondary capture position and no longer in the open position. Cinch pawl 537, having shifted inward, is therefore shifted into position to block the lug 36*b* in the opening direction via second end 537*b* and to hold the ratchet 36 in the secondary striker capture position. This movement of the override lever 539, cinch link lever 541, and cinch pawl 537 occurs due to the bias on the override lever 539.

Figure 2:
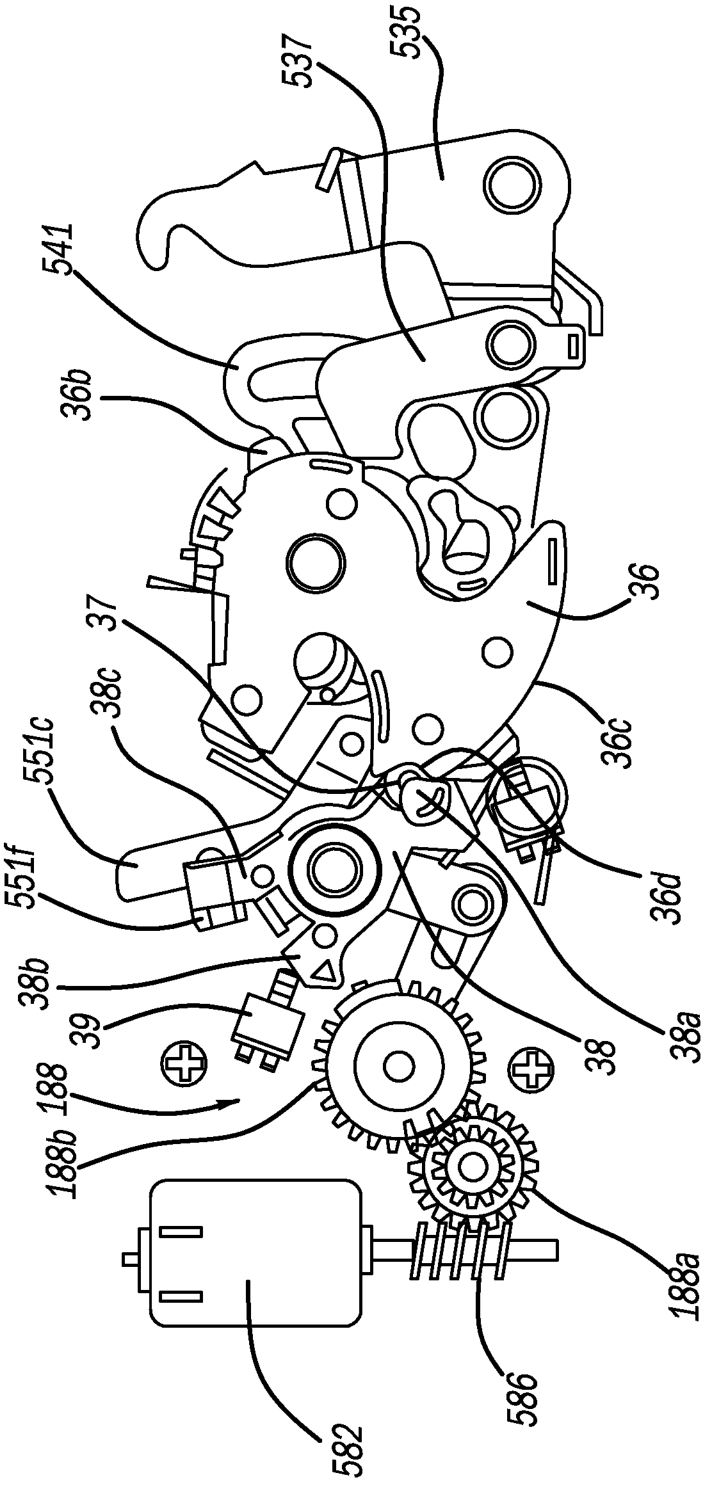
FIG. 2 is bottom perspective view of the ratchet and cinching system, including a main pawl on one side of the ratchet and the cinch pawl on the opposite side of the ratchet.

With reference to FIG. 2, on the opposite side of ratchet 36 relative to the cinch pawl 537, a first end 38*a* of main pawl 38 is biased against an outer curved surface 36*c* of pawl 36 when the ratchet 36 is in the open position (ratchet 36 is shown in the primary striker capture position or cinched striker capture position in FIG. 2, and would be rotated clockwise in FIG. 2 to the open position). In this open position of the ratchet 36, second end 38*b* of main pawl 38 is in contact with sensor or switch 39, indicating the ratchet 36 is not in the fully closed position or cinched striker capture position. The main pawl 38 will continue to contact the switch 39 during a closing movement of the ratchet 36 until the ratchet 36 reaches the cinched position, and the main pawl 38 has shifted into a ratchet checking position (shown in FIG. 2) and in contact with ratchet notch 36*d*, thereby holding the ratchet 36 in position. More particularly, when the ratchet 36 moves from the open position to the secondary striker capture position, the ratchet 36 may be held in place by the cinch pawl 537 against moving toward the open position. The cinch pawl 537, having moved into this ratchet blocking position, causes sensor or switch 540 to indicate that the ratchet is no longer in the open position. In this position, switch 39 still indicates that the fully cinched position has not yet been reached, because the first end of main pawl 38*a* is still in contact with the curved outer surface 36*c* of the ratchet. Once cinching causes further rotation of the ratchet 36, the main pawl 38 shifts out of contact with switch 39. FIGS. 2 and 3 each illustrate switches 39 and 540 out of contact with main pawl 38 and override lever 539, respectively, which occurs in the cinched striker capture position shown. The function of the cinch pawl 537 to hold the ratchet in the secondary latched position is described below.

Figure 6:
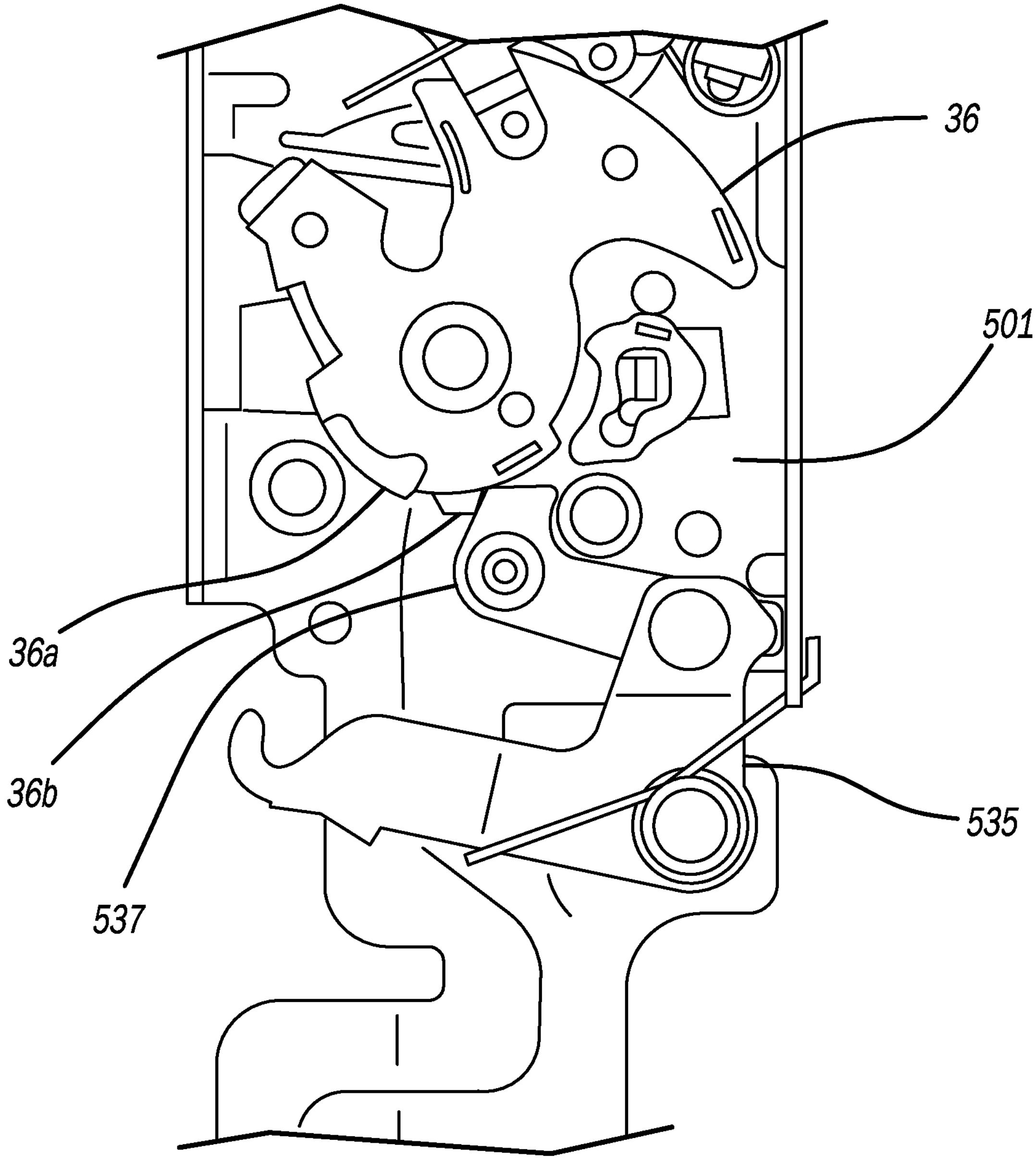
FIG. 6 is a plan view of the ratchet and cinch system, with the ratchet in the secondary latched position.
Figure 7:
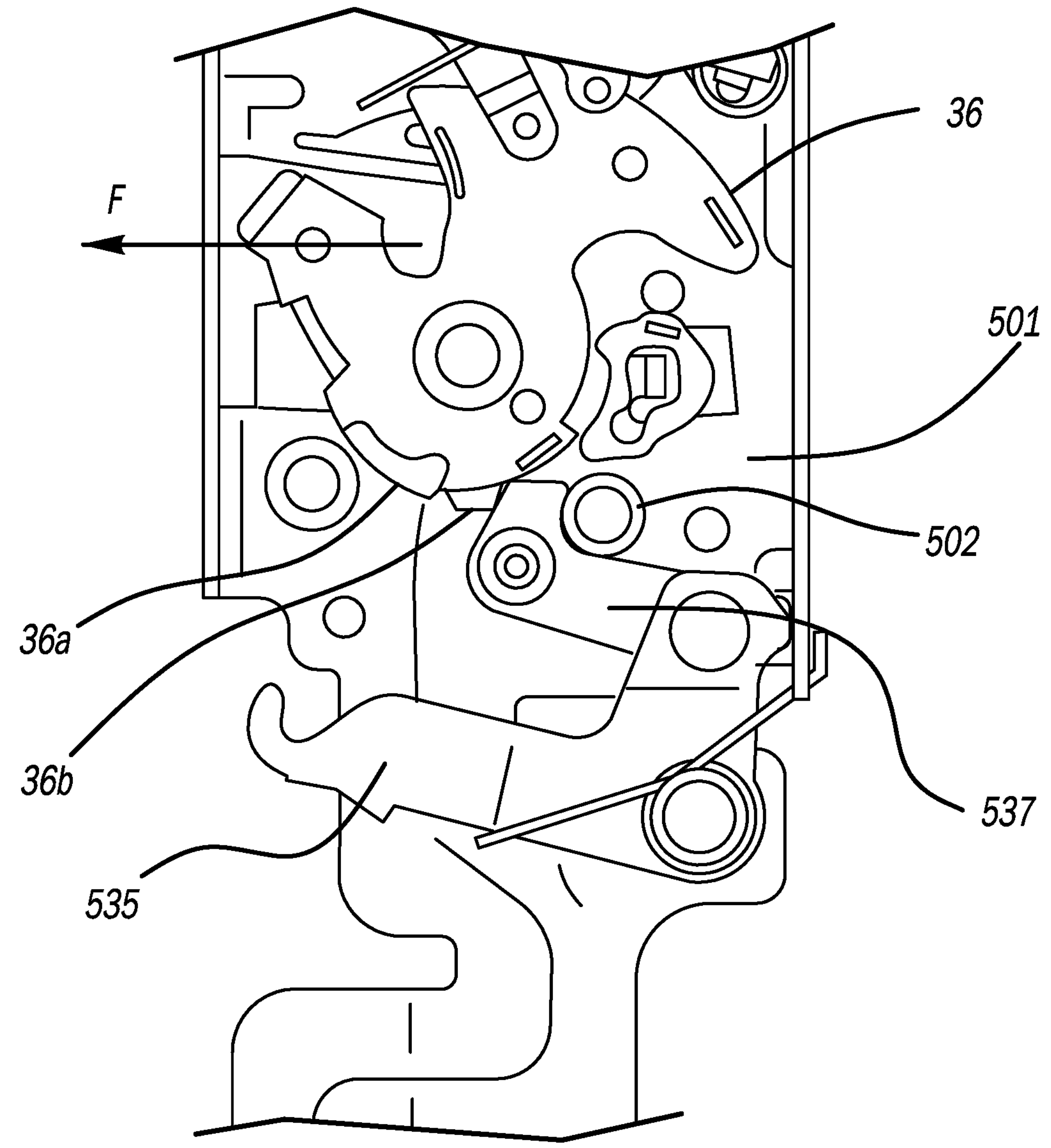
FIG. 7 is a plan view similar to FIG. 6, illustrating the stop blocking the cinch pawl and holding the ratchet in the secondary latched position.

FIGS. 6 and 7 illustrate the ratchet 36 after being rotated from its open position into the secondary latched position (also known as a first notch position). In this state, projection 36*a* has translated (clockwise in FIGS. 6 and 7) past cinch link lever 541 (which had been in contact with projection 36*a*), and lug 36*b* has traveled past cinch pawl 537 (such that lug 36*b* is shown on the left of cinch pawl 537 in FIG. 6), and cinch pawl 537 has moved inward toward the ratchet 36. In this position, a reverse force F on the ratchet 36 (for instance from the striker if the door is being forced toward the open position manually of from a seal load) would pull the lug 36*b* counter-clockwise to the right against the cinch pawl 537, which is now in the path of the lug 36*b* following an inward pivotal movement of the cinch link lever 541 (after projection 36*a* is no longer blocking such pivotal movement of cinch link lever 541).

In this position shown in FIGS. 6 and 7, cinch pawl 537 is blocked and stopped from allowing rotational movement in the ratchet opening direction (counter-clockwise in FIGS. 6 and 7). When the cinch pawl 537 is blocked and stopped from allowing rotational movement in the ratchet opening direction the cinch pawl 537 may be in compression, or may be compressed between the ratchet 36 and the frame 501. An opening force entered by the ratchet 36 on the cinch pawl 537 may therefore be transferred to the latch housing or frame 501, reducing or eliminating any such forces applied to a pivot point of the cinch lever 535. As a result the cinch pawl 537 may withstand higher opening forces since the cinch pawl 537 is not subjected to a tensile force and the higher opening forces are not applied to the pivot axis or pin of the cinch lever 535. Rather the opening forces may be applied by the cinch pawl 537 to the latch housing or frame 501, and for example directly to the structure or stamped metal of the frame 501 through abutment of the cinch pawl 537 with a feature on the frame 501. Further, the frame 501 portion, such as the stop 502, may be configured as a high strength feature of the frame 501, and for example provided as a mounting point for receiving a fastener for mounting the frame 501 to the vehicle door 16.

Figure 5:
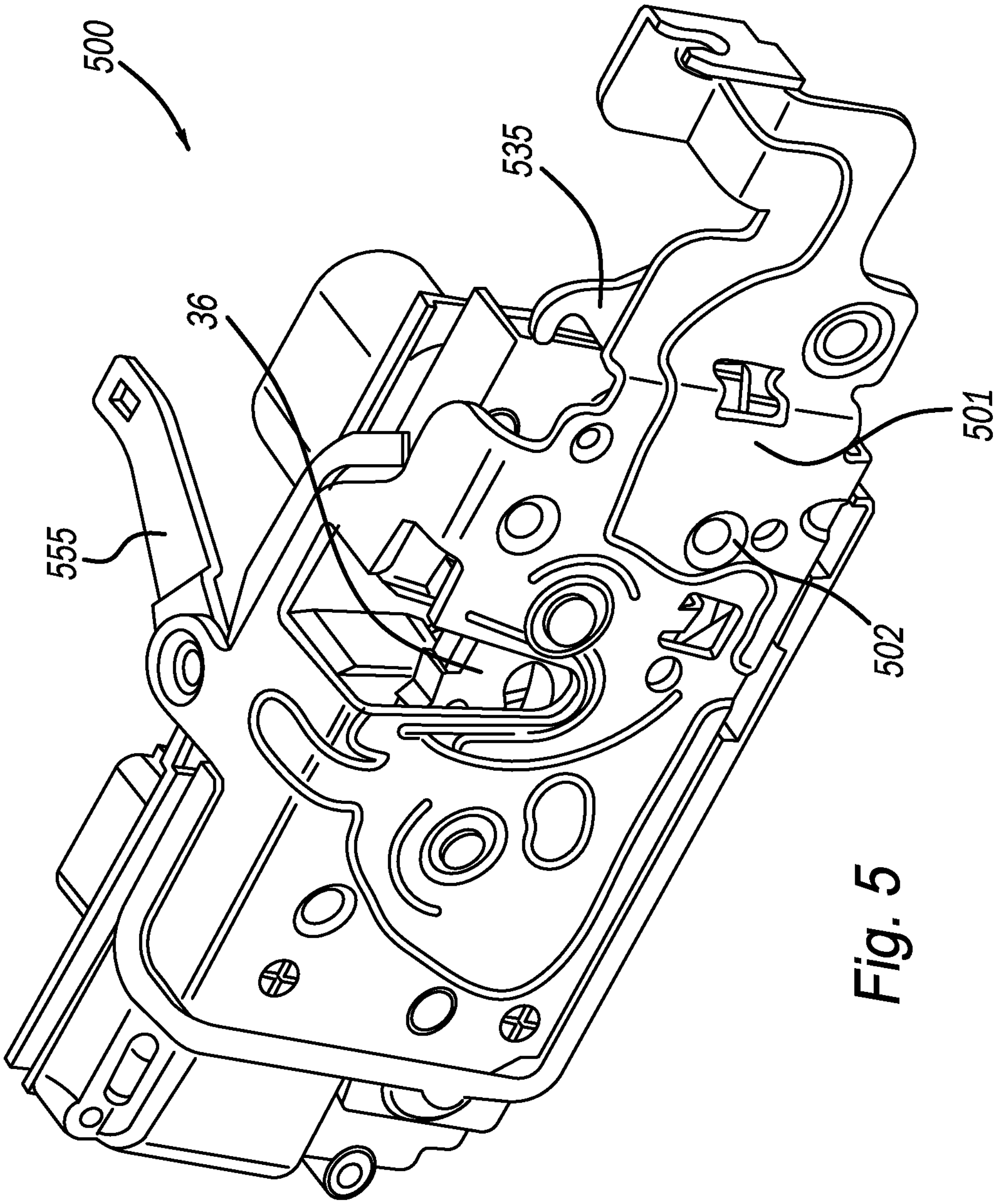
FIG. 5 is a bottom perspective view of the latch system illustrating the stop.

With reference to FIGS. 5-7, latch assembly 500 includes frame 501, which includes ring-shaped stop 502 that is provided in the path of cinch pawl 537. Stop 502 blocks the cinch pawl 537 in response an opening force F imposed on the ratchet 36 and causing lug 36*b* to exert a corresponding force on cinch pawl 537.

Stop 502 may be defined by the frame structure 501 itself, and may be formed from a metal stamping operation or the like. Stop 502, being ring-shaped, may define a through-opening or through-hole 502*a* through which a fastener may extend. Said fastener may also extend through opening 541*e* of cinch link lever 541 for mounting the frame 501 to corresponding latch housing structure that encloses the latch components. The stop 502 therefore provides a robust blocking arrangement for the cinch pawl 537 that can resist large opening forces imparted on the ratchet 36.

In the "first notch" position shown in FIGS. 6 and 7, the ratchet 36 is not yet cinched and fully closed. In this position, the cinch pawl 537 is also in position to cinch the ratchet 36 closed in response to actuation of the cinching function. As described above, and shown in FIG. 3, cinch link lever 541 is pivoted inward toward the ratchet 36 in response to closing movement of the ratchet 36 from the open position to the first notch position. Such movement of cinch link lever 541 (once becoming unblocked by projection 36*a*) is caused by corresponding pivoting of override lever 539 according to its bias away from switch 540 (counter-clockwise in FIG. 3). More particularly, first end 539*a* of override lever 539 is coupled with cinch link lever 541 via slot 539*d* (which receives post 541*c*) is biased away from the ratchet 36, and second end 539*b* of override lever 539 is biased toward ratchet 36, and moves away from switch 540 when cinch link lever 541 is allowed to pivot inward toward ratchet 36.

Accordingly, in response to the allowed movement of override lever 539, latch controller receives a signal that ratchet 36 has moved out of the open position and reached the "first notch" position, and that cinching shall now occur. Accordingly, a cinching actuation is provided on cinch lever 535 (via a cinch cable or other actuation mechanism), which causes cinch lever 535 to pivot about its axis at pin 535*x*, thereby causing cinch pawl 537 to push on lug 36*b* of ratchet 36 and to rotate ratchet 36 toward its fully closed and cinched position (clockwise in FIGS. 4, 6, and 7). FIGS. 2-4 illustrates the ratchet 36 in the fully closed and cinched position, and with the cinch mechanism reset after actuation, with the cinch lever 537 being spaced away from the lug 36*b* but in the path of the lug 36*b*.

As shown in FIG. 2, as ratchet 36 reaches its fully closed and cinched position, main pawl 38 engages the notch 36*d* on the opposite side of the ratchet 36 from the cinch pawl 537, thereby reaching the rather checking position and holding ratchet 36 in place and against movement toward the open position. In response to main pawl 38 pivoting inward toward ratchet 36 and holding the ratchet 36, pawl 38 is no longer in contact with switch 39, thereby sending a signal to the vehicle controller that the cinching function shall stop. The ratchet 36 is now held in in primary striker capture position or cinched striker capture position. Following the cinching operation, the cinch lever 535 and cinch pawl 537 may return to their nominal or non-actuated position, shown for example in FIG. 3.

The operation to release the ratchet 36 from the cinched striker capture position will be apparent from the Figures, such as FIGS. 2-4. To release the ratchet 36, gear system 188 may be actuated by motor 586 to pull on pawl lever 551 (FIG. 3). The pawl lever 551 includes a first leg 551*a* coupled to a pawl link lever 553, a second leg 551*b* for contacting override lever 539, and a third leg 551*c* for contacting manual release lever 555 and for actuating main pawl 38.

Pawl link lever 553 has a first end 553*a* coupled to the first leg 551*a* and a second end 553*b* coupled to the gear mechanism 188. The first end 553*a* includes slot 553*c* that engages with post 551*d* extending from first leg 551*a*. Thus, as gear mechanism 188 is actuated, pawl link lever 553 will pull on the first leg 551*a*, causing pivoting movement of pawl lever 551 about its pivot axis at pin 551*e*.

The pawl lever 551 is operable to both move pawl 38 from its ratchet checking position and also to move override lever 539 in response to actuation and pivotable movement about pin 551*e*. More particularly, leg 551*b* exerts a force on override lever 539, which in turn pivots and moves cinch link lever 541 and cinch pawl 537 out of the path of projection 36*a* and lug 36*b*, respectively, such that the ratchet 36 may rotate to its open position. Leg 551*c* includes a flange 551*f*, which contacts leg 38*c* of main pawl 38 to pivot the pawl 38 and first end 38*a* out of the notch 36*d* of the ratchet 36. Thus, the ratchet 36 is released on opposite sides thereof by both the main pawl 38 and the cinch pawl 537.

Pawl lever 551 is also manually actuatable out of its ratchet checking position by either the inside or outside door handle, via manual release lever 555. More particularly, manual release lever 555 may be actuated by a release member such as cable 555*a*, such that the opposite end of the lever 555 will contact third leg 551*c* of the pawl lever 551, which will similarly operate to actuate override lever 539, cinch link lever 541, and cinch pawl 537. The manual actuation of also actuates main pawl 38. During manual actuation of the pawl lever 555, post 551*d* will slide within the slot 553*c* with the gear mechanism non-actuated.

After the opening command (power or manual) is complete, and the ratchet 36 has moved to the open position after being release by both main pawl 38 and cinch pawl 537, the cinch link lever 541 will once again be biased against the outer surface of projection 36*a*, and cinch pawl 537 will be correspondingly remain pivoted out of the path of lug 36*b*. Movement of the ratchet 36 toward the secondary striker capture position, and then the cinched striker capture position, can therefore subsequently occur.

It will be appreciated that the above description may be used in a variety of latch locations in which a cinch functionality is desirable. It will further be appreciated that alternative actuation mechanisms for the pawl lever 551 and/or cinch lever 535 may also be used. The use of the screw ring on the frame 501 to support the cinch pawl 537 and block the ratchet 36 from opening from the secondary striker capture position provides improved ratchet holding functionality while also being easily released in response to a desired actuation.

Figure 8:
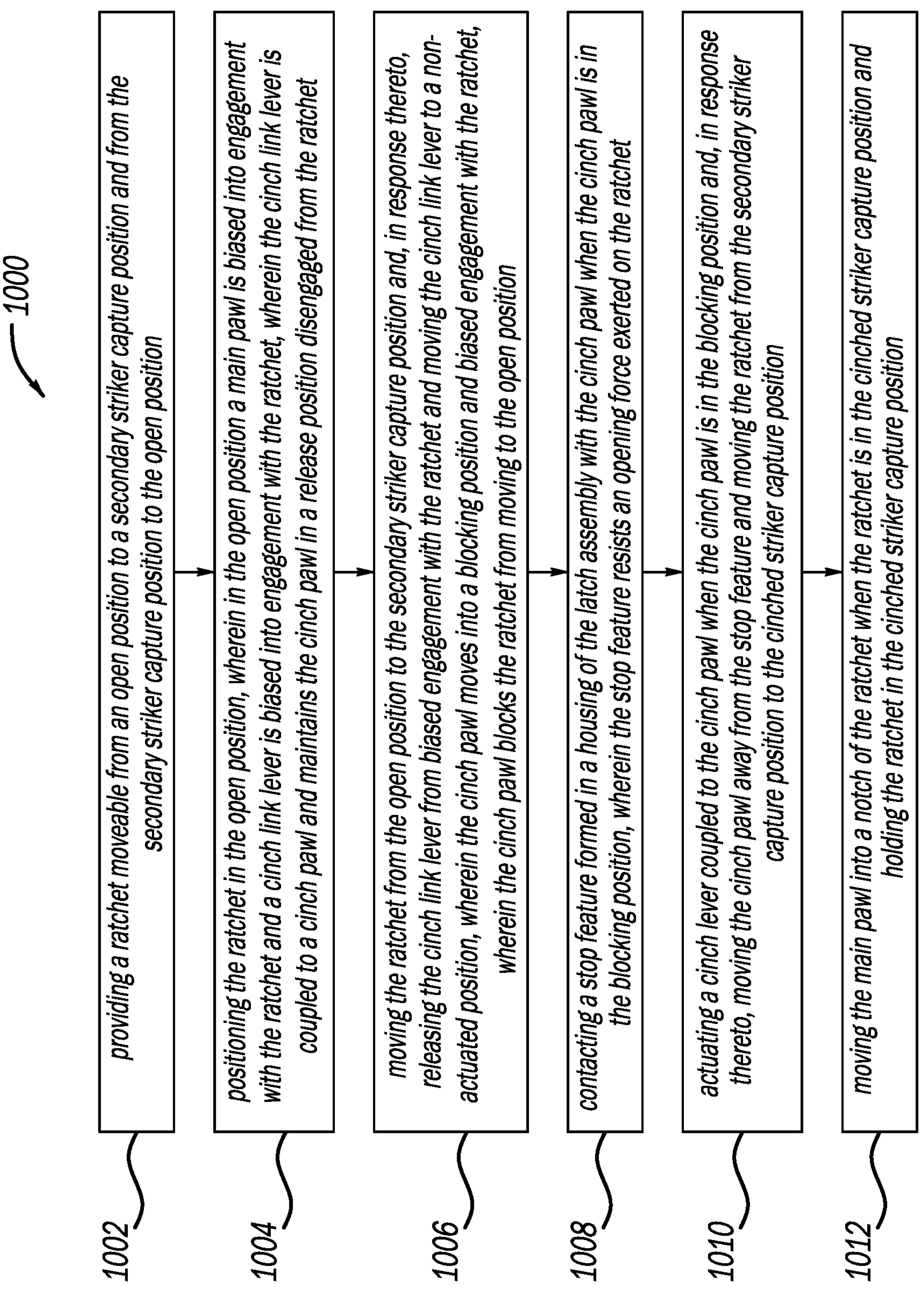
FIG. 8 illustrates a method of operating a latch assembly according to an aspect of the disclosure.
Figure 9:
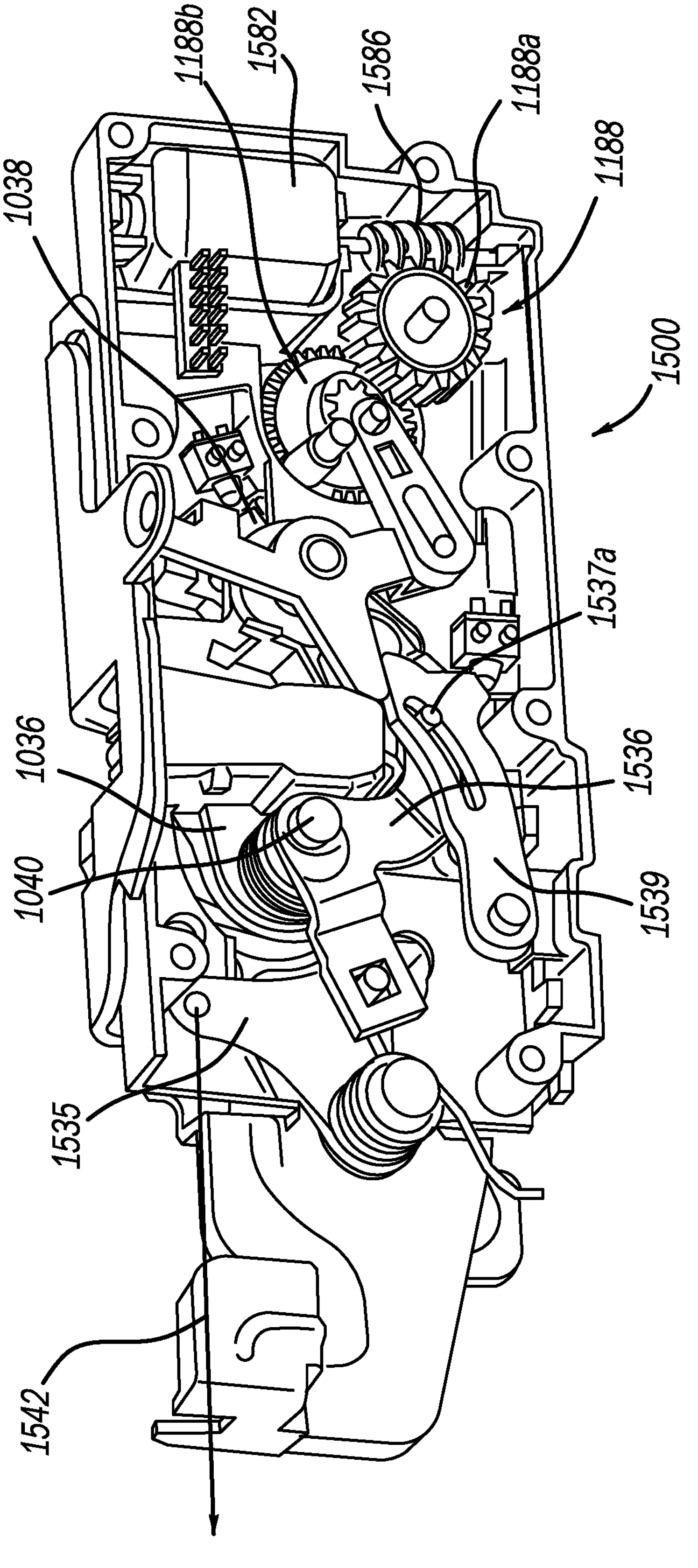
FIG. 9 is a perspective view of an interior of another latch system, illustrating a ratchet and a cinching system including a cinch link lever that is coaxial with the ratchet.

Turning now to FIG. 8, a method 1000 of operating a latch mechanism having a ratchet, a main pawl, and a cinch pawl is provided, the method including the following steps, according to one aspect. At step 1002, providing a ratchet moveable from an open position to a secondary striker capture position and from the secondary striker capture position to a cinched striker capture position or the open position. At step 1004, positioning the ratchet in the open position, wherein in the open position a main pawl is biased into engagement with the ratchet and a cinch link lever is biased into engagement with the ratchet, wherein the cinch link lever is coupled to a cinch pawl and maintains the cinch pawl in a release position disengaged from the ratchet. At step 1006, moving the ratchet from the open position to the secondary striker capture position and, in response thereto, releasing the cinch link lever from biased engagement with the ratchet and moving the cinch link lever to a non-actuated position, wherein the cinch pawl moves into a blocking position and biased engagement with the ratchet, wherein the cinch pawl blocks the ratchet from moving to the open position. At step 1008, contacting a stop feature formed in a housing of the latch assembly with the cinch pawl when the cinch pawl is in the blocking position, wherein the stop feature resists an opening force exerted on the ratchet. At step 1010, actuating a cinch lever coupled to the cinch pawl when the cinch pawl is in the blocking position and, in response thereto, moving the cinch pawl away from the stop feature and moving the ratchet from the secondary striker capture position to the cinched striker capture position. At step 1012, moving the main pawl into a notch of the ratchet when the ratchet is in the cinched striker capture position and holding the ratchet in the cinched striker capture position.

Turning now to FIG. 9-17, FIGS. 9-13 illustrate another embodiment of a latch system 1500, which may be used with latch 18 of FIG. 1A or other vehicle latches, similar to latch 500 described above) including motor 1582, worm 1586, and gear assembly 1188 (including compound gear 1188*a* in meshed engagement with worm 586 and second gear 1188*b* in meshed engagement with compound gear 1188*a*). Latch system 1500 also includes main pawl 1038, which is pivotally biased toward the ratchet 1036 and operable to slide along an outer edge of ratchet 1036 when the ratchet 1036 is moving toward the closed position, and is further operable to engage the ratchet 1036 perform a ratchet-holding function to keep the ratchet 1036 in a cinched striker capture position. Main pawl 1038 is further operable to be power actuated to release the ratchet 1036, thereby allowing the ratchet 1036 to open to a ratchet released position. It will be apparent to those skilled in the art that certain components of latch system 500 and 1500 may be interchangeable, including but not limited to the illustrated ratchets, sensors, release levers, housings, cables, controllers, and gear assemblies of systems 500 and 1500.

Figure 10:
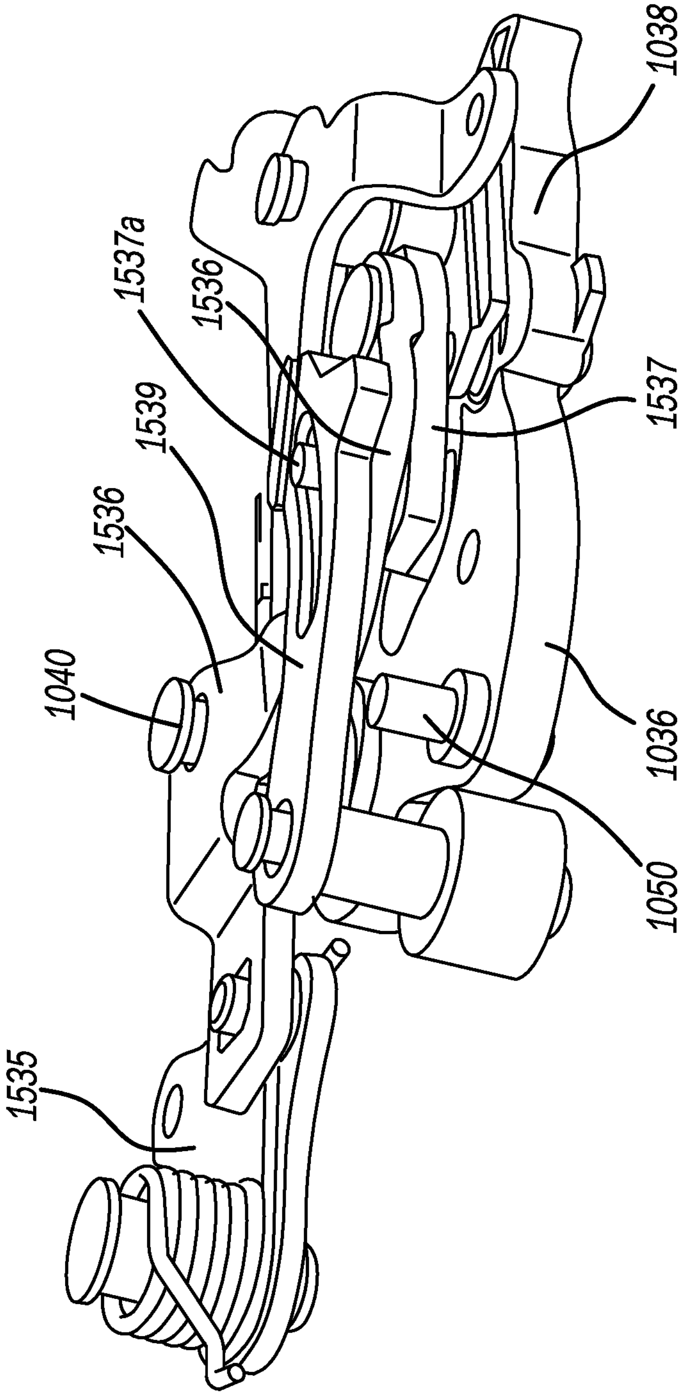
FIG. 10 is a perspective view of the ratchet and the cinch system of FIG. 9 including a plurality of levers of the cinch system.

The cinch function is provided by a plurality of operably connected cinch levers, at least one of which is pivotable about the same axis as ratchet 1036 (or, coaxial with ratchet 1036) of latch assembly 1500. The plurality of cinch levers include cinch lever 1535, aux lever or cinch link lever 1536, secondary cinch pawl 1537 (see FIG. 10), and override lever 1539. Ratchet 1036 includes engagement member or pin 1050, which is contacted or engaged by cinch pawl 1537 during the cinching operation, thereby forcing ratchet 1036 toward and into the cinched striker capture position. Cinch link lever 1536 is pivotable about ratchet pivot post/axis 1040, which is the axis about which the ratchet 1036 pivots open and closed. Ratchet pivot post 1040 is designed to resist high loads due to the requirements and function of the ratchet 1036 in retaining striker 20. Accordingly, pivot post 1040 can also be relied on to provide similar strength to the cinch link lever 1536 when the cinch link lever 1536 is mounted to and supported by the same pivot post 1040. As further described below, as the ratchet 1036 is closed in response to a door-closing operation where the striker 20 (FIG. 1A; typically mounted to vehicle structure) impacts the ratchet 1036, the various cinch levers described will be correspondingly actuated at different stages of the ratchet 1036 position, such that a cinching operation will be performed on the ratchet 1036, in particular via the cinch pawl 1537 and ratchet pin 1050 (which may project outwardly from the plane of the ratchet 1036, as shown in FIG. 10). The projection of ratchet pin 1050 that projects outwardly from the plane of the ratchet 1036 is different than the engagement member or lug 36*b* of ratchet 36 described above, which is projects generally in plane with the ratchet 36.

As shown in FIG. 10, Override lever 1539 is disposed above cinch link lever 1536. Cinch link lever 1536 includes opposite legs or ends that are engaged with cinch lever 1535 and cinch pawl 1537, respectively. The cinch link lever 1536 has portions bent relative to each other to be disposed in different planes, thereby allowing for its ends to be disposed adjacent the connected components. The cinch pawl 1537 is disposed below the cinch link lever 1536, and is aligned height-wise with the ratchet pin 1050. A pin 1537*a* is attached to the cinch pawl 1537 and extends through slot 1536*a* of cinch link lever 1536 and into slot 1539*a* of the override lever 1539. Thus, the cinch link lever 1536 is rotatable and moveable relative to the override lever 1539, with the pin 1537*a* sliding along the slot 1539*a*, thereby moving the cinch pawl 1537. Additionally, the cinch pawl 1537 is pivotable relative to the cinch link lever 1536, moving along slot 1536*a*, thereby being operably coupled to the override lever 1539 such that pivoting of the override lever 1539 will cause pivoting movement of the cinch pawl 1537 (for example to release the ratchet 1036 by moving the cinch pawl 1537 out of the way of the ratchet pin 1050).

Figure 14:
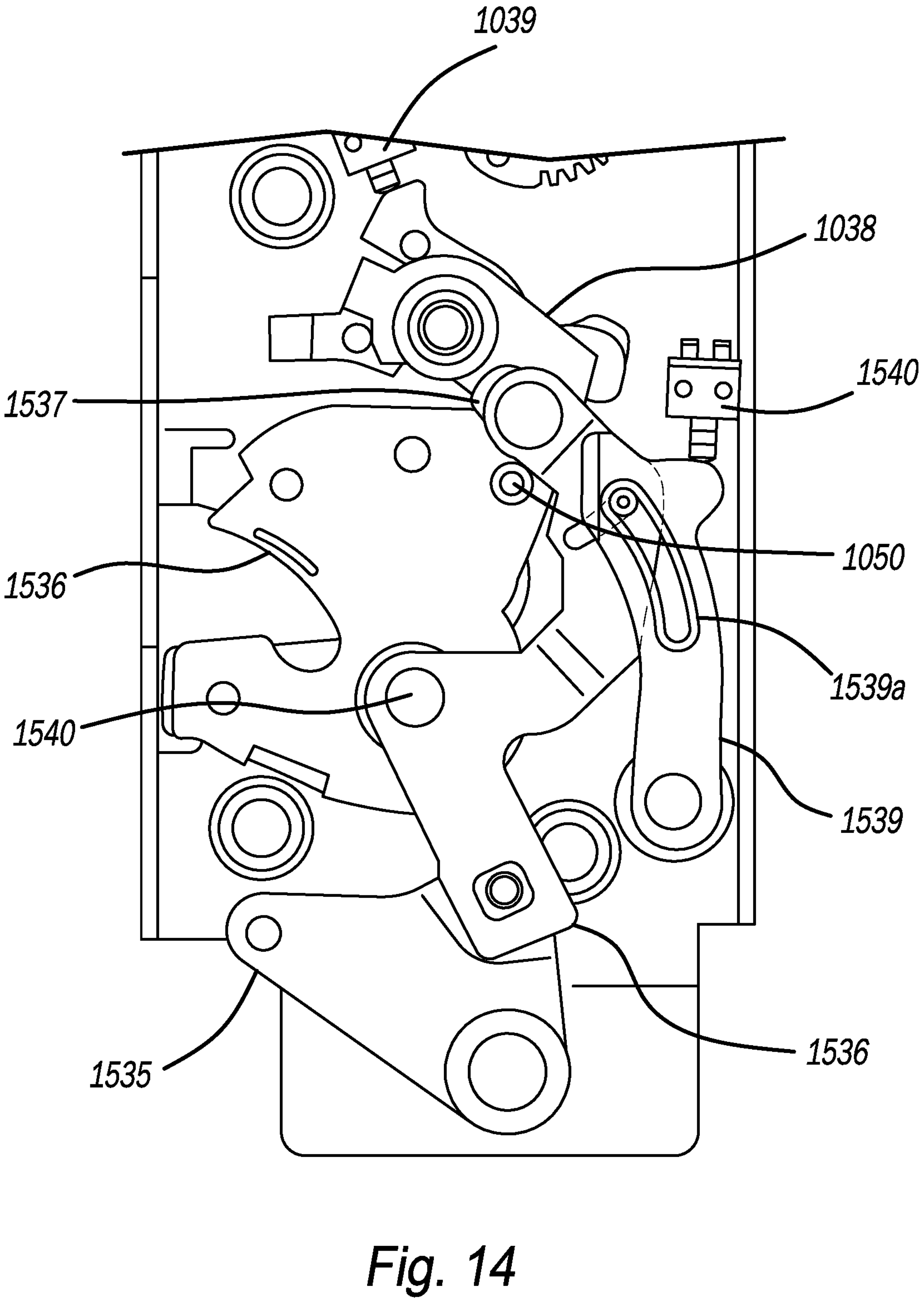
FIG. 14 is a plan view of the latch system and cinch system illustrating the ratchet in an open position and levers of the cinch system in a first position.

FIG. 14 illustrates the latch system 1500 with the ratchet 1036 in the fully open position. Main pawl 1038 is engaged with pawl sensor or switch 1039 (similar to the arrangement of latch system 500). Override lever 1539 is engaged with override lever sensor or switch 1540 (similar to latch 500). Ratchet pin 1050 is offset relative to cinch pawl 1537, and cinch pawl 1537 is biased toward ratchet pin 1050 and bears against and abuts the side of the ratchet pin 1050. The bias on the cinch pawl 1537 may be provided by the override lever 1539 being biased inward. Cinch lever 1535, cinch link lever 1536, and override lever 539 are in a non-actuated position (or first position), prepared to perform a cinching function in response to actuation of the cinch lever 1535.

In FIG. 14, pin 1537*a* is at an outer end of slot 1536*a* and an outer end of slot 1539*a*. Pin 1537*a* is blocked from moving inward along slot 1536*a* by the ratchet pin 1050, and is further held against moving inward along slot 1539*a* by the bias on cinch link lever 1536.

Figure 15:
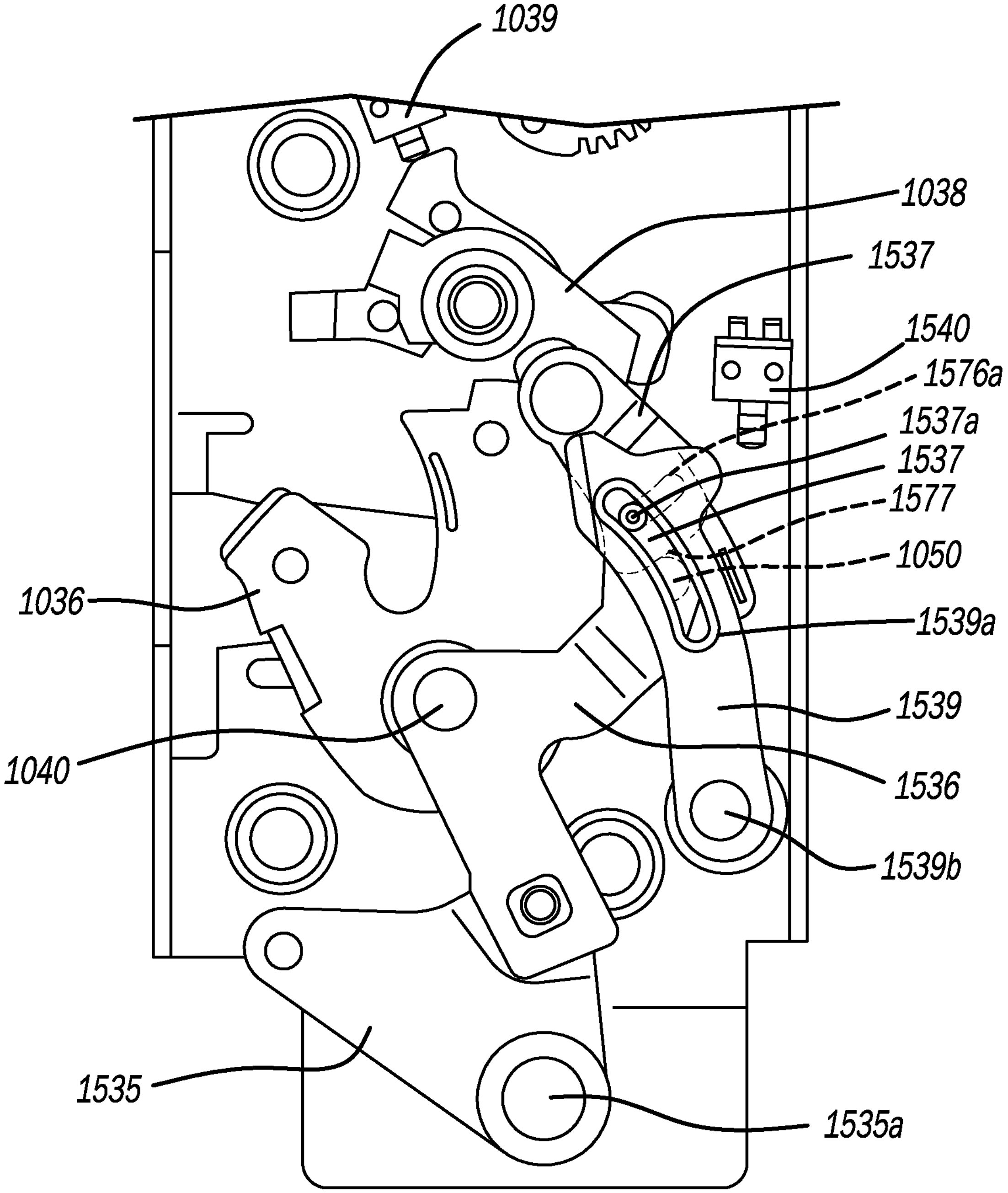
FIG. 15 is a plan view of the latch system illustrating the ratchet in a secondary striker capture position with the ratchet partially closed and some of the levers of the cinch system in a second position.

FIG. 15 illustrates ratchet 1036 in a secondary striker capture position, following a door closing operation in which a striker (not shown) has impacted the slot of the ratchet 1036 and caused it the ratchet 1036 to rotate against its bias. Rather post 1050 has translated past the end of cinch pawl 1537. Cinch pawl 1537, being pivotally biased toward post 1050, has pivoted inward relative to the cinch link lever 1536 following the post 1050 translating past the end of cinch pawl 1537. The end of the cinch pawl 1537 is in position to block ratchet post 1050 (and ratchet 1036) from pivoting in a ratchet release direction (counter-clockwise in FIG. 15), and the ratchet 1036 is held in the secondary striker capture position (which may also be referred to as the first notch position).

Figure 11:
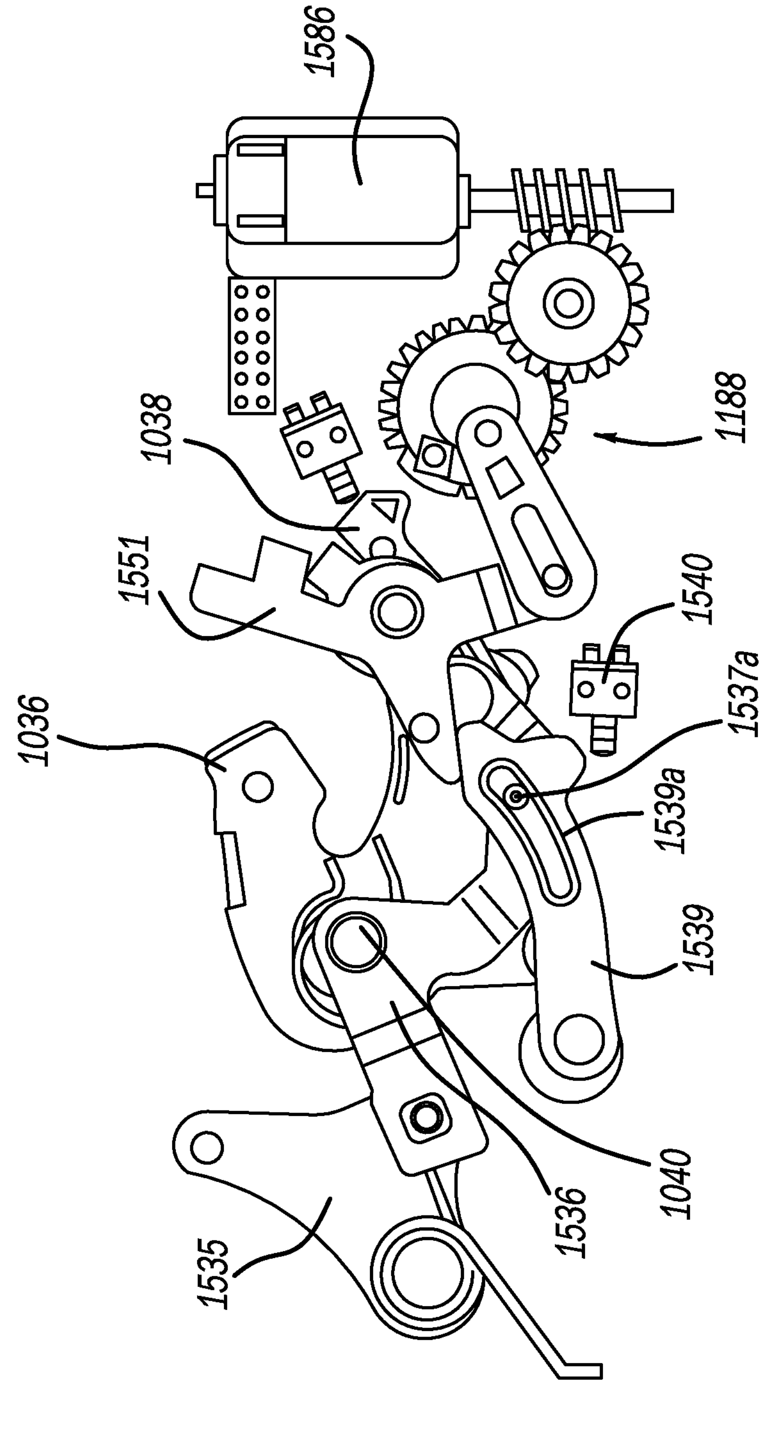
FIG. 11 is a perspective view of the ratchet, cinching system, and a main pawl of the latch assembly of FIG. 9, including a pair of sensors.
Figure 12:
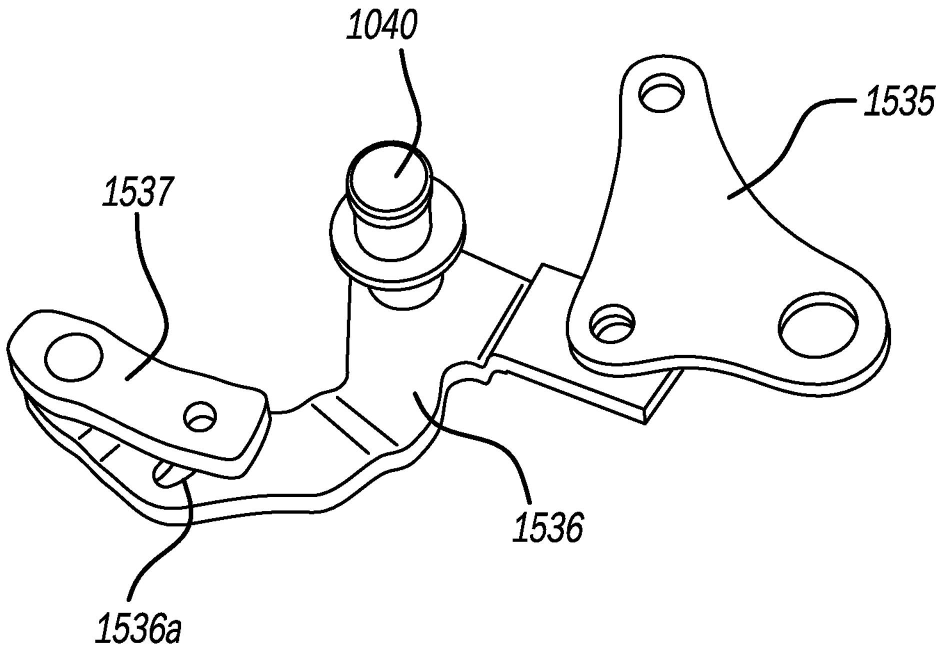
FIG. 12 is a perspective views of a plurality of interconnected levers of the cinch system of FIG. 9, including the cinch link lever that is coaxial with the ratchet.
Figure 13:
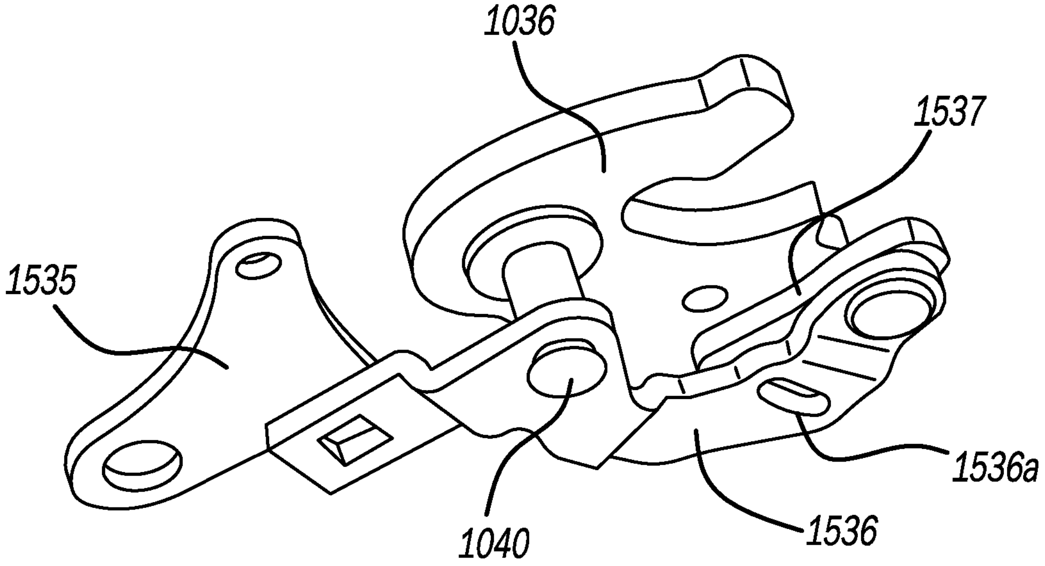
FIG. 13 is a perspective views of a plurality of interconnected levers of the cinch system of FIG. 9, including the cinch link lever that is coaxial with the ratchet.

Cinch pawl 1537 includes pin 1537*a* (which extends through slot 1536*a*, as shown in FIGS. 10-12, of cinch link lever 1536 allowing pin 1537*a* to translate with cinch pawl 1537 relative to the cinch link lever 1536). Pin 1537*a* also extends through slot 1539*a* of override lever 1539, thereby operatively coupling cinch pawl 1537 to override lever 1539 in certain directions. As cinch pawl 1537 pivots, for example, pin 537*a* pulls override lever 1539 toward ratchet 1036. Alternatively, as the ratchet post 1050 moves beyond the end of the cinch pawl 1537, the override lever 1036 pushes the pin 1537*a* and the cinch pawl 1537 inwardly. Override lever 1539 is pivotable about axis 1539*b*, and in response to movement of the ratchet 1036, along with movement of the cinch pawl 1537 during a ratchet closing operation, override lever 1539 disengages from override lever switch 1540, thereby providing a signal to the latch controller (not explicitly shown here, but shown with reference to system 500, which is also applicable here) that the cinching operation shall begin. When the pin 1537*a* moves inwardly along with the override lever 1539, the pin 1537*a* also moves slightly inward along the slot 1539*a*.

Figure 16:
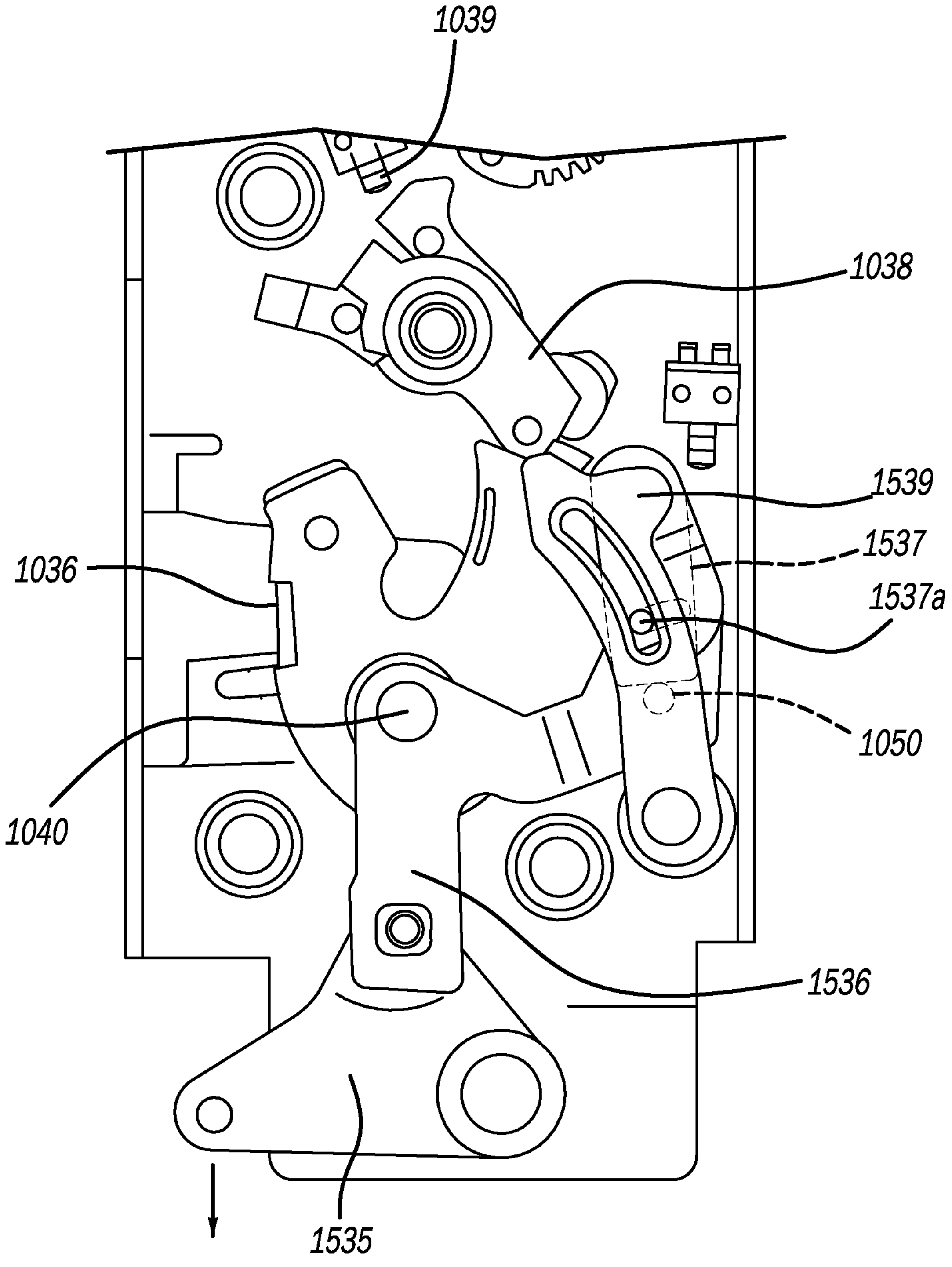
FIG. 16 is a plan view of the latch illustrating the ratchet in a cinched striker capture position and additional levers of the cinch system in a second position.

In response to receiving the signal at the latch controller, cinch lever 1535 is actuated via cinch cable 1542, such as via power actuation caused by a power actuator that pulls on cinch cable 1542, and the cinch lever 1535 pivots about axis 1535*a* (counter-clockwise in FIG. 16). Cinch lever 1535 is coupled to cinch link lever 1536, thereby pulling on the end of the cinch link lever 1536 and pivoting cinch link lever 1536 clockwise about ratchet pivot post 1040 (which is the same pivot post 1040 that supports the ratchet 1036). Rotation of cinch link lever 1536 concurrently pulls on cinch pawl 1537, which applies a pushing force on ratchet post 1050, due to the end of the cinch pawl 1537 being aligned and in plane with the ratchet post 1050. In this position, the cinch pawl 1537 overlaps the surface/face of the ratchet 1036 (unlike the inch pawl 537 of latch system 500). Ratchet post 1050 accordingly rotates and cinches ratchet 1036 further in the clockwise direction concurrent with movement of cinch link lever 1536 and the cinch pawl 1537 caused by the cinching function.

As the ratchet 1036 continues to rotate, main pawl 1038 continues to bear against the outer surface of ratchet 1036. Once ratchet 1036 rotates a sufficient amount to the cinched striker capture position (or second notch position), pawl 1038 will pivot inward and into engagement with notch 1036*a* of ratchet 1036. This pivotable movement of pawl 1038 inward and engaging with the 1036*a* notch disengages pawl 1038 from switch 1039, thereby sending a signal to the latch controller to stop the cinching function. The ratchet 1036 is held in the primary striker capture position and cinched striker capture position (second notch position).

During the cinching operation between the first notch position and the second notch position, the pin 1537*a* will slide along the slot 1539*a*, such that the override lever 1539 generally remains in its inward position and out of engagement with the sensor 1540. As shown in FIG. 16, the pin 1537*a* is at the inner end of the slot 1539, and the override lever 1539 is not engaged with the switch 1540. The override lever 1539 is in the same position in FIG. 16 as in FIG. 15, while the other moveable components have pivoted, rotated, or moved relative to FIG. 15. FIG. 16 still shows the cinch lever 1535 in its actuated position.

Subsequently, the cinch lever 1535 and cinch link lever 1536 may be reset after the pawl 1038 is in its ratchet checking position shown in FIG. 16. In response to receiving the signal from sensor 1039, a signal to stop actuation of cinch lever 1535 may be sent to the power actuation, thereby allowing the cinch lever 1535 to rotate clockwise relative to FIG. 16 according to its bias, which causes corresponding movement of cinch link lever 1536 and cinch pawl 1537 away from the ratchet post 1050. The ratchet 1036 remains in its second notch position due to main pawl 1038. Override lever 1539 remains in its inward position, and the end of cinch pawl 1537 remains aligned with, but away from, the ratchet post 1050.

To release the ratchet 1036 from the closed second notch positon shown in FIG. 16, the latch may be actuated either manually or via power actuation. In power actuation, gear system 1188 may be actuated by motor 1586 to pull on pawl lever 1551 (FIG. 11), which is operable to both move pawl 1038 from its ratchet checking position and to move override lever 1539, and therefore cinch pawl 537, outwardly away from the ratchet 1036 and back to their first position shown in FIG. 14, such that the ratchet notch 1036*a* and the post 1050 are no longer blocked by the pawl 1038 and the cinch pawl 1537, respectively, and the ratchet 1036 may rotate toward the open position according to its bias about pivot post 1040. As override lever 1539 is pulled away, cinch pawl 1537 is correspondingly pulled out of the path of pin 1050, thereby allowing ratchet 36 to be released and opened. With override lever 1539 in its outward position, switch 1540 is again activated. Override lever 1539 will remain in its outward position after the ratchet 1036 has moved toward its open position due to the cinch pawl 1537 being blocked from inward movement by the ratchet post 1050 being inwardly disposed relative to the cinch pawl 1537

Pawl lever 1551 is also manually actuatable out of its ratchet checking position by either the inside or outside door handle. For example, when actuated manually, pawl lever 1550 will be pulled, causing the same movement of the pawl 1038, override lever 1539, and cinch pawl 1537 as in the power actuation, which will similarly operate to push override lever 1539 and cinch pawl 1537 away from ratchet pin 1050, allowing for the ratchet 1036 to be manually released. The gear system 1188 includes a slot, shown in FIG. 9, allowing the pawl lever 1551 to be actuated and pivoted relative to the gears that remain unactuated.

Figure 17:
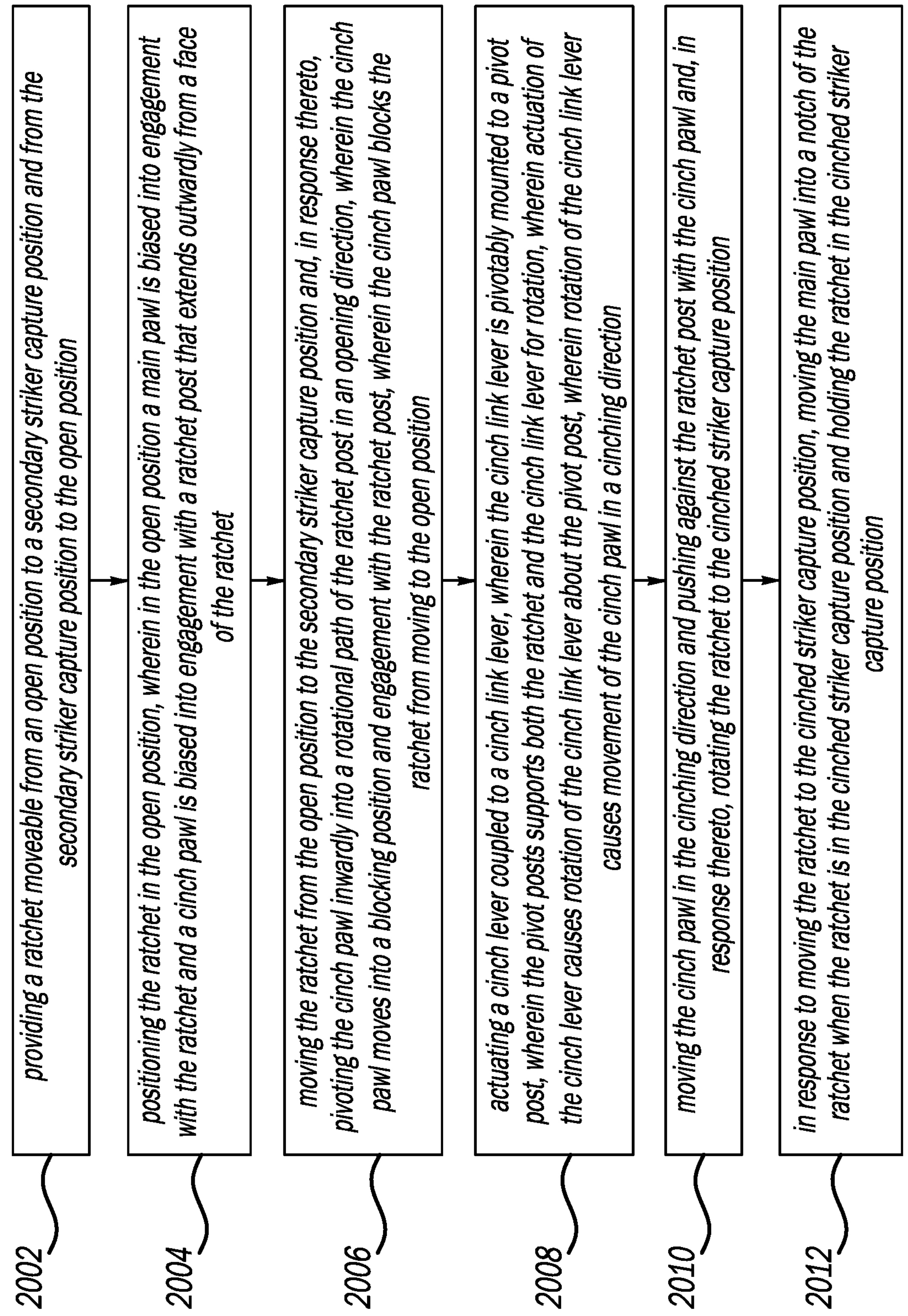
FIG. 17 is a method of operating a latch, in accordance with aspects of the present disclosure.

With reference to FIG. 17, a method 2000 of operating a latch mechanism having a ratchet, a main pawl, and a cinch pawl is provided, the method including the following steps, according to one aspect. At step 2002, providing a ratchet moveable from an open position to a secondary striker capture position and from the secondary striker capture position to a cinched striker capture position. At step 2004, positioning the ratchet in the open position, wherein in the open position a main pawl is biased into engagement with the ratchet and a cinch pawl is biased into engagement with a ratchet post that extends outwardly from a face of the ratchet. At step 2006, moving the ratchet from the open position to the secondary striker capture position and, in response thereto, pivoting the cinch pawl inwardly into a rotational path of the ratchet post in an opening direction, wherein the cinch pawl moves into a blocking position and engagement with the ratchet post, wherein the cinch pawl blocks the ratchet from moving to the open position. At step 2008, actuating a cinch lever coupled to a cinch link lever, wherein the cinch link lever is pivotably mounted to a pivot post, wherein the pivot posts supports both the ratchet and the cinch link lever for rotation, wherein actuation of the cinch lever causes rotation of the cinch link lever about the pivot post, wherein rotation of the cinch link lever causes movement of the cinch pawl in a cinching direction. At step 2010, moving the cinch pawl in the cinching direction and pushing against the ratchet post with the cinch pawl and, in response thereto, rotating the ratchet to the cinched striker capture position. At step 2012, in response to moving the ratchet to the cinched striker capture position, moving the main pawl into a notch of the ratchet when the ratchet is in the cinched striker capture position and holding the ratchet in the cinched striker capture position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A latch assembly (500) for a motor vehicle, comprising:

a ratchet (36) moveable between an open position whereat said ratchet is positioned to release a striker and at least two striker capture positions whereat said ratchet is positioned to retain the striker, wherein said at least two striker capture positions include a secondary latched position and a cinched striker capture position;

a ratchet biasing member for normally biasing said ratchet (36) toward its open position;

a pawl (38) moveable between a ratchet checking position whereat said pawl is positioned to hold said ratchet (36) in the cinched striker capture position and a ratchet release position whereat said pawl permits movement of said ratchet to its open position;

a pawl biasing member for normally biasing said pawl (36) toward its ratchet checking position;

a latch cinch mechanism (535, 537, 539, 541) including a cinch link lever (541) having a first position that engages a first engagement member (36*a*) on said ratchet (36) when said ratchet is in its open position and being biased toward the first engagement member, wherein movement of the ratchet toward the secondary latched from the open position causes the cinch link lever to move to a second position;

a cinch pawl (537) coupled to said cinch link lever (541) and having a first position disengaged from the ratchet (36) when the cinch link lever is in its first position, wherein movement of the cinch link lever to its second position moves the cinch pawl toward a second position thereof;

a cinch lever (535) coupled to said cinch pawl that moves the cinch pawl when in the second position from a non-actuated position to an actuated position in a cinching direction;

an override lever (539) coupled to the cinch link lever (541) and moveable between a first position and a second position, wherein movement of the override lever from its second position to its first position causes movement of the cinch link lever to its first position, and wherein movement of override lever from its first position to its second position occurs in accordance with movement of the cinch link lever from its first position to its second position in response to movement of the ratchet (36) from the open position to the secondary striker capture position;

wherein movement of the ratchet (36) from its open position toward its secondary striker capture position causes the cinch link lever (541), cinch pawl (537), and override lever (539) to move to their second positions;

wherein, following movement of the ratchet (36) to its secondary striker capture position from the open position, actuation of the cinch lever (535) to its actuated position causes sliding movement of the cinch pawl (537) relative to the cinch link lever (541), wherein the cinch pawl contacts a second engagement member (36*b*) of the ratchet, thereby forceably moving the ratchet to its cinched striker capture position, and wherein the pawl (38) moves to its ratchet checking position;

wherein the latch assembly (500) includes a frame (501), and the frame includes a stop (502) projecting from an inner surface thereof, wherein following movement of the ratchet (36) to its secondary striker capture position, the stop blocks the cinch pawl (537) from moving in a direction opposite the cinch direction and the cinch pawl blocks the second engagement member from moving toward the open position in response to an opening force exerted on the ratchet.

2. The latch assembly of claim 1, wherein the override lever (539) is biased toward its second position and is held in its first position by the cinch link lever (541) when the cinch link lever is in its first position and the ratchet (36) is in the open position.

3. The latch assembly of claim 2, wherein the override lever (539) contacts an override sensor (540) when in the first position to indicate that the ratchet (36) is in the open position and the cinch link lever (541) is in its first position, and wherein the override lever is out of contact with the override sensor when in its second position and the cinch link lever (541) is in the second position to indicate that the ratchet is in the secondary striker capture position or the cinched striker position.

4. The latch assembly of claim 1, wherein, when the ratchet (36) is in the cinched striker capture position and the pawl (38) is in the ratchet checking position, actuation of the pawl via manual actuation or power actuation release causes both the pawl and the cinch pawl (537) to move away from engagement with the ratchet (36) and the ratchet moves to the open position.

5. The latch assembly of claim 1, wherein the second engagement member (36*b*) is on a first side of the cinch pawl (537) when the ratchet (36) is in the open position and the second engagement member is on a second side of the cinch pawl when the ratchet is in the secondary striker capture position or the cinched striker capture position, wherein the ratchet and second engagement member are biased toward the first side of the cinch pawl such that the cinch pawl blocks the ratchet and second engagement member from moving toward the open position when the cinch pawl is in the path of the second engagement member.

6. The latch assembly of claim 1, wherein actuation of the pawl (38) to release the ratchet (36) when the cinch lever (535) and cinch pawl (537) are actuated causes movement of the cinch pawl (537) out of engagement with the ratchet (36) and allowing the ratchet to move to the open position.

7. The latch assembly of claim 1, wherein, following actuation of the pawl (38) to the ratchet release position, and corresponding movement of the ratchet (36) to the open position and, the cinch link lever (541) and the cinch pawl (537) are biased toward the ratchet by the override lever (539), and the cinch pawl is maintained out of the path of the second engagement member (36*b*).

8. A latch assembly (500) for a motor vehicle, the latch assembly comprising:

a ratchet (36) biased toward an open position and moveable from the open position to a secondary striker capture position, and from the secondary striker capture position to a primary striker capture position;

a main pawl (38) biased toward the ratchet (36) and operable between a ratchet checking position where the main pawl holds the ratchet in the primary striker capture position and a ratchet release position where the main pawl allows the ratchet to move to the open position;

a cinch mechanism (535, 537, 539, 541) including a cinch pawl (537) biased toward the ratchet (36) and operable between a blocking position where the cinch pawl blocks movement of the ratchet from the secondary striker capture position to the open position and a release position where the cinch pawl allows the ratchet to move from the secondary striker capture position to the open position; and a stop feature (502) formed on a latch housing (501), wherein the cinch pawl (537) is disposed between the stop feature and the ratchet (36) when the cinch pawl is in the blocking position, wherein the stop feature resists an opening force exerted on the ratchet when the cinch pawl is in the blocking position and in contact with the stop feature such that the opening force exerted on the ratchet is transferred to the latch housing via the stop feature;

wherein the cinch pawl (537) is moveable from the blocking position to an actuated position and away from the stop feature (502) in response to actuation by a cinch lever (535) coupled to the cinch pawl, wherein movement of the cinch pawl to the actuated position moves the ratchet (36) to the primary striker capture position, wherein the main pawl (38) moves to the ratchet checking position in response to the ratchet moving to the primary striker capture position.

9. The latch assembly of claim 8, wherein the cinch mechanism (535, 537, 539, 541) includes a cinch link lever (541) coupled to the cinch pawl (537), wherein the cinch link lever is biased toward a non-actuated position and moveable to an actuated position in response to actuation of the main pawl (38), wherein the cinch link lever moves the cinch pawl to the release position in response to actuation of the cinch link lever during actuation of the main pawl.

10. The latch assembly of claim 9, wherein the cinch link lever (541) is biased against the ratchet (36) and held in the actuated position when the ratchet is in the open position, wherein the cinch link lever moves to the non-actuated position in response to movement of the ratchet from the open position to the secondary striker capture position, wherein the cinch pawl (537) moves to the blocking position in response to the cinch link lever moving to the non-actuated position.

11. The latch assembly of claim 8, wherein the stop (502) is integrally formed with the latch housing (501).

12. The latch assembly of claim 11, wherein the stop (502) has a ring shape and defines a through-hole (502*a*) configured for receiving a fastener therethrough for fastening the latch housing (501).

13. The latch assembly of claim 12, wherein the cinch pawl (537) is biased towards the stop.

14. The latch assembly of claim 8, wherein a roller is provided between the ratchet and the pawl.

15. The latch assembly of claim 8, wherein with the ratchet (36) in the primary striker capture position and the pawl in the ratchet checking position, the cinch pawl is in alignment with and spaced from a second engagement member (36*b*) of the ratchet.

16. The latch assembly of claim 8, wherein with the ratchet (36) in the secondary striker capture position and the pawl in the ratchet releasing position, the cinch pawl is in compression between a second engagement member (36*b*) of the ratchet and the stop.

17. The latch assembly of claim 16, wherein the second engagement member (36*b*) is a lug extending from the ratchet.

18. A latch assembly (500) for a motor vehicle, the latch assembly comprising:

a latch housing having a frame plate (501);

a ratchet (36) supported on the frame plate and biased toward an open position and moveable from the open position to a secondary striker capture position, and from the secondary striker capture position to a primary striker capture position;

a main pawl (38) supported on the frame plate and biased toward the ratchet (36) and operable between a ratchet checking position where the main pawl holds the ratchet in the primary striker capture position and a ratchet release position where the main pawl allows the ratchet to move to the open position; and a cinch mechanism (535, 537, 539, 541) including a cinch pawl (537) pivotally coupled to a cinch lever biased toward the ratchet (36) and operable between a blocking position where the cinch pawl blocks movement of the ratchet from the secondary striker capture position to the open position and a release position where the cinch pawl allows the ratchet to move from the secondary striker capture position to the open position;

wherein an opening force exerted on the ratchet when the cinch pawl is holding the ratchet in the second striker capture position causes the cinch pawl to be compressed between the ratchet and the frame plate such that the opening force exerted on the ratchet is transferred to the frame plate and not to a pivot pin of the cinch lever.

19. The latch of claim 18, wherein a stop feature (502) is formed on the frame plate (501), wherein the cinch pawl (537) is disposed between the stop feature and the ratchet (36) when the cinch pawl is in the blocking position, wherein the stop feature resists an opening force exerted on the ratchet when the cinch pawl is in the blocking position and in contact with the stop feature.

* * * * *